US009243087B2

(12) United States Patent
Karjala et al.

(10) Patent No.: US 9,243,087 B2
(45) Date of Patent: Jan. 26, 2016

(54) LDPE ENABLING HIGH OUTPUT AND GOOD OPTICS WHEN BLENDED WITH OTHER POLYMERS

(75) Inventors: Teresa P. Karjala, Lake Jackson, TX (US); Nilesh R. Savargaonkar, Pearland, TX (US); Jose Ortega, Lake Jackson, TX (US); Brad A. Cobler, Lake Jackson, TX (US); Lori L. Kardos, Lake Jackson, TX (US); Wallace W. Yau, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 241 days.

(21) Appl. No.: 12/482,517

(22) Filed: Jun. 11, 2009

(65) Prior Publication Data

US 2010/0317804 A1 Dec. 16, 2010

(51) Int. Cl.
C08F 110/02 (2006.01)
C08F 10/02 (2006.01)
C08J 5/18 (2006.01)
C08L 23/04 (2006.01)
C08L 23/06 (2006.01)
C08L 23/08 (2006.01)

(52) U.S. Cl.
CPC . *C08F 10/02* (2013.01); *C08J 5/18* (2013.01); *C08L 23/04* (2013.01); *C08L 23/06* (2013.01); *C08L 23/0815* (2013.01); *C08F 110/02* (2013.01); *C08J 2323/04* (2013.01); *C08J 2323/06* (2013.01); *C08L 2205/02* (2013.01)

(58) Field of Classification Search
CPC .............................. C08L 23/0815; C08F 10/02
USPC ................................................ 526/352, 352.2
See application file for complete search history.

(56) References Cited

U.S. PATENT DOCUMENTS

| 2,870,130 | A | * | 1/1959 | Davison et al. ............... 528/220 |
| 4,511,609 | A | | 4/1985 | Craver et al. |
| 4,599,392 | A | | 7/1986 | McKinney et al. |
| 4,705,829 | A | | 11/1987 | Kwack et al. |
| 5,128,212 | A | * | 7/1992 | Kneale et al. ................. 428/516 |
| 5,272,236 | A | | 12/1993 | Lai et al. |
| 5,278,272 | A | | 1/1994 | Lai et al. |
| 5,741,861 | A | | 4/1998 | Yamamoto et al. |
| 6,054,544 | A | | 4/2000 | Finlayson et al. |
| 6,335,410 | B1 | | 1/2002 | Finlayson et al. |
| 6,407,191 | B1 | | 6/2002 | Mezquita et al. |
| 6,723,810 | B2 | | 4/2004 | Finlayson et al. |
| 7,312,283 | B2 | * | 12/2007 | Martin et al. ................. 526/116 |
| 2007/0011946 | A1 | | 1/2007 | Mullen et al. |
| 2007/0117946 | A1 | * | 5/2007 | Schwab et al. ............. 526/348.1 |
| 2007/0123678 | A1 | * | 5/2007 | Gonioukh et al. ............. 526/352 |
| 2007/0167578 | A1 | | 7/2007 | Arriola et al. |
| 2008/0038533 | A1 | | 2/2008 | Best et al. |
| 2008/0125553 | A1 | | 5/2008 | Conrad et al. |
| 2008/0138593 | A1 | * | 6/2008 | Martinez ....................... 428/220 |
| 2010/0076160 | A1 | * | 3/2010 | Beran et al. ................... 525/387 |
| 2010/0168330 | A1 | | 7/2010 | Demoirors et al. |
| 2011/0021713 | A1 | | 1/2011 | Demirors et al. |
| 2011/0130533 | A1 | | 6/2011 | Karjala et al. |
| 2011/0196105 | A1 | | 8/2011 | Eddy et al. |

FOREIGN PATENT DOCUMENTS

| EP | 0928797 A1 | 7/1999 |
| JP | 61241339 A | 10/1986 |
| JP | 2005232227 A | 9/2005 |
| WO | 03055926 A1 | 7/2003 |
| WO | 03/091262 | 11/2003 |
| WO | 2004078800 A1 | 9/2004 |
| WO | 2006/049783 A1 | 5/2006 |
| WO | 2007061593 A1 | 5/2007 |
| WO | 2007136495 A2 | 11/2007 |
| WO | 2007136496 A2 | 11/2007 |
| WO | 2007136497 A2 | 11/2007 |
| WO | 2007136506 A2 | 11/2007 |
| WO | 2010042390 A1 | 4/2010 |
| WO | 2010141557 A1 | 12/2010 |
| WO | 2011019563 A1 | 2/2011 |
| WO | 2011032172 A1 | 3/2011 |
| WO | 2011032174 A1 | 3/2011 |
| WO | 2011032176 A1 | 3/2011 |

OTHER PUBLICATIONS

Sammler et al. "Zero-Shear Viscosity/Molecular Weight Method for the Detection of Long-Chain Branching in Polyolefins", SPE ANTEC Proceedings, Chicago, 1023, May 17-20, 2004.
Yau, Wallace, "Examples of Using 3D-GPC—TREF for Polyolefin Characterization", Macromol. Symp., 2007, 257, 29-45, Wiley-VCH Verlag GmbH & Co. KGaA, Weinheim.
PCT/US10/038285 Search Report and Written Opinion.
PCT/US10/038285 International Preliminary Report on Patentability.

* cited by examiner

*Primary Examiner* — Irina Krylova

(57) ABSTRACT

An ethylene-based polymer characterized as having a density from about 0.9 to about 0.94 grams per cubic centimeter, a molecular weight distribution ($M_w/M_n$) from about 8 to about 30, a melt index ($I_2$) from about 0.1 to about 50 grams per 10 minutes, a gpcBR value greater than 1.4 as determined by a gpcBR Branching Index and a Y value less than about 2 is disclosed. This ethylene-based polymer is especially useful for blending with other polymers such as LLDPE. When converting the blends into film, especially blown film, bubble stability and output is increased.

13 Claims, 12 Drawing Sheets

LDPE ENABLING HIGH OUTPUT AND GOOD OPTICS WHEN BLENDED WITH OTHER POLYMERS

BACKGROUND OF THE INVENTION

There are many types of polyethylene made and sold today. One type in particular is made by various suppliers and sold in large quantities. This polyethylene is called high pressure free radical polyethylene (usually called LDPE) and is usually made using a tubular reactor or an autoclave reactor or sometimes a combination. Sometimes polymer users blend LDPE with other polymers such as linear low density polyethylene (LLDPE) to try to modify properties such as flowability or processability.

We have now discovered new LDPE polymers which, especially when blended with LLDPE, can have improved processability especially in terms of increased output due to increased bubble stability, while maintaining other performance attributes.

SUMMARY OF THE INVENTION

An ethylene-based polymer characterized as having a density from about 0.9 to about 0.94 grams per cubic centimeter, a molecular weight distribution ($M_w/M_n$) from about 8 to about 30, a melt index ($I_2$) from about 0.1 to about 50 grams per 10 minutes, a gpcBR value greater than 0.05 as determined by a gpcBR Branching Index and a log_LSCDF value (Y) less than about 2, and preferably less than about 1.5, and most preferably less than about 1.2, has now been made. The ethylene polymer can be a homopolymer or a copolymer. Preferably, the ethylene-based polymer can have a molecular weight distribution ($M_w/M_n$) from about 8 to about 12. At least one film layer comprising the ethylene-base polymer can be made, preferably wherein the film layer has a machine direction (MD) shrink tension greater than 15 psi.

Compositions comprising the ethylene-based polymer and at least one other natural or synthetic polymer can be made, e.g., by discrete polymer blends. The synthetic polymer can be selected from the group consisting of linear low density polyethylene (LLDPE), high density polyethylene (HDPE), and a low density polyethylene (LDPE). Preferably the synthetic polymer comprises LLDPE, especially at least 50 percent or greater, by weight of the composition. At least one film layer comprising the compositions can also be made. Preferably the ethylene polymer has a GPC Mw and a zero shear viscosity ($\eta_o$)(Pa*s) relationship log ($\eta_o$(Pa*s))>3.6607*log (GPC Mw)−14.678 and/or a melt strength at 190° C. in cN of greater than 11.5 cN.

In another embodiment, we have made an ethylene-based polymer with a surface haze, S, an internal haze, I, both in units of % haze and both determined using a Surface and Internal Haze method, and a melt index ($I_2$) in grams per 10 minutes, where the numerical values of S, I, and $I_2$ correspond to the following relationship:

$$S/I \geq (-2*I_2)+8.$$

in which the total haze is less than 9.5%, preferably wherein the melt index is greater than 0.5 and less than 2.

In yet another embodiment, we have made an ethylene-based polymer characterized as having a density from about 0.9 to about 0.94 grams per cubic centimeter, a molecular weight distribution ($M_w/M_n$) from about 8 to about 30, a melt index ($I_2$) from about 0.1 to about 50 grams per 10 minutes, a gpcBR value greater than 0.05 as determined by a gpcBR Branching Index, a GPC-LS characterization Y value less than about 2, a surface haze, S, an internal haze, I, both in units of % haze and both determined using a Surface and Internal Haze method, where the numerical values of S, I, and $I_2$ correspond to the following relationship:

$$S/I \geq (-2*I_2)+8$$

in which the total haze is less than 9.5%.

DETAILED DESCRIPTION OF THE INVENTION

Figure 1:
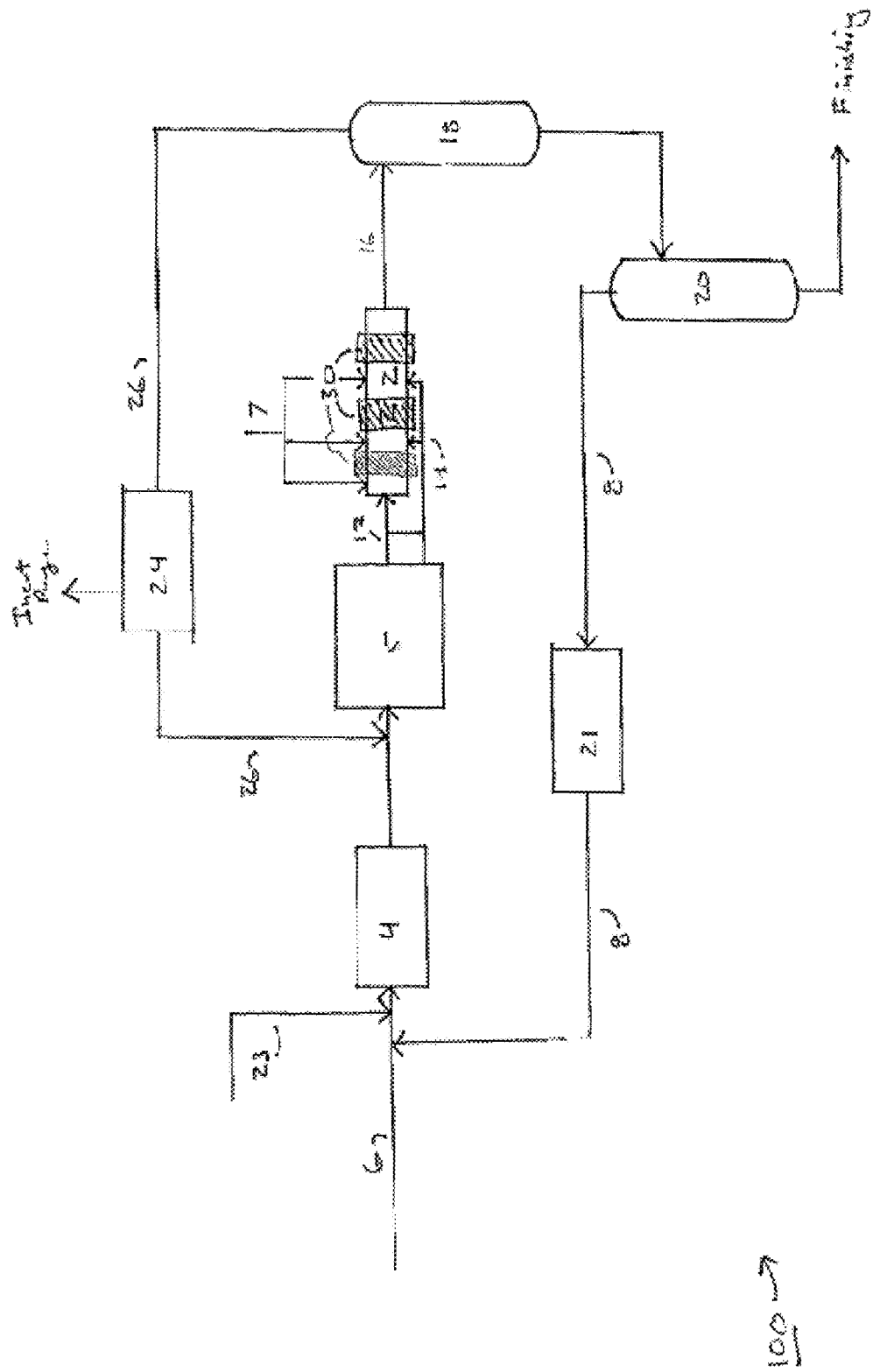
FIG. 1 is a diagram of a process describing the elements of a disclosed tube reactor system 100.

A LDPE (low density polyethylene) resin that would allow film converters to increase the output rates on their blown film lines when blended at 5 to 80% (weight basis) with a LLDPE (linear low density polyethylene) resin with general retention of mechanical properties would be useful.

Using the high pressure LDPE tubular technology, a resin is developed with broad molecular weight distribution (MWD). When this resin is blended at 20% with a LLDPE resin on a blown film line, a 4 to 7% increase in the maximum output rate is observed as compared to a comparative LDPE resin that could be achieved on this line.

The melt index of the LDPE ethylenic based polymer is from about 0.1 to about 50 g/10 minutes, preferably from about 0.2 to about 5 g/10 minutes. The density of the LDPE ethylenic based polymer is about 0.9 to about 0.94 g/cm³, preferably from about 0.918 to about 0.927 g/cm³. The LDPE ethylenic based polymer can have a melt strength of from about 11 to about 40 cN. The LDPE ethylenic based polymers can have a MWD (Mw/Mn) of from about 8 to about 30, a gcpBR of about 1.4 to about 10, and a MD shrink tension from about 15 to 40 cN.

The low density ethylene-based polymer may be a homopolymer of ethylene. The low density ethylene-based polymer may be an ethylene-based interpolymer comprised of ethylene and at least one comonomer. Comonomers useful for incorporation into an ethylene-based interpolymer, especially an ethylene/α-olefin interpolymer include, but are not limited to, propylene, isobutylene, 1-butene, 1-pentene, 1-hexene, and mixtures thereof. Ethylene is frequently copolymerized with at least one $C_3$-$C_{20}$ α-olefin, such as propene, 1-butene, 1-hexene and 1-octene.

The low density ethylene-based polymer can exhibit a numerical relationship between internal haze, surface haze, and $I_2$ melt index of the polymer that is different than other low density ethylene-based polymers. The $I_2$ melt index is determined using the Melt Index method, described infra in the Test Methods section. The internal haze and the surface haze are determined using the Surface and Internal Haze method, described infra in the Test Methods section.

A low density ethylene-based polymer is disclosed that exhibits a relationship between the concentration-normalized light scattering (LS) response value and the logarithm value of conventionally calibrated molecular weight, $M_{w, GPC}$, that is different than that of other low density ethylene-based polymers. The difference is captured in a relationship called the log_LSCDF. The log_LSCDF is determined by the GPC-LS Characterization method, described infra in the Test Methods section. The ethylene-based low density polymer has a log_LSCDF of less than about 2.

Methods are well known in the art for using a tubular reactor to form low density ethylene-based polymers. The process is a tubular polymerization reaction where a process fluid partially comprised of ethylene is free-radically polymerized creating a highly exothermic reaction. The reaction occurs under high operating pressure (1000 bar to 4000 bar) in turbulent process fluid flow (hence low density ethylene-based polymers also referred to as "high pressure" polymers) at maximum temperatures in the reactor of 160° C. to 360° C., while the initial initiation temperature for the reaction is between 120° C. to 200° C. At certain points along the tube, a portion of the heat produced during the free-radical polymerization may be removed through the tube wall. Typical single-pass conversion values for a tubular reactor range from about 20-40 percent. Tubular reactor systems also include at least one monomer recycle loop to improve conversion efficiency.

For the purposes of describing the process, a non-limiting tubular polymerization reaction system is shown in FIG. 1. A tube reactor system 100 has a tube 2 with a length typically from about 250 to about 2000 meters. The length and diameter of the tube affects the residence time and velocity of the process fluid as well as the heat addition/removal capacity of tube 2. Suitable, but not limiting, reactor lengths can be between 100 and 3000 meters, and some between 500 and 2000 meters. Tube 2 also has a working internal diameter from about 30 to about 100 mm based upon desired system throughput, operational pressure range, and the degree of turbulent flow for mixing and reaction. The working internal diameter may widen and narrow at points along tube 2 to accommodate different portions of the process, such as turbulent mixing, injection of reaction initiators and feeds, and process fluid throttling (i.e., accelerating process fluid velocity at the expense of pressure loss).

Referring back to FIG. 1 and tube reactor system 100, a primary compressor 4, which may be a multi-stage compressor or two or more compressors running in parallel, is connected at its intake side to a source of fresh monomer/comonomer feed called fresh feed conduit 6 and a low pressure system recycle conduit 8. The low pressure system recycle conduit 8 is one of two recycle loops feeding volatilized process fluid from the refining section of the tube reactor system 100 back to the front of the process. In the disclosed processes, the low pressure system recycle conduit 8 primarily contains ethylene, but it may also contain unused comonomer and other process additives, such as residual chain transfer agents. The primary compressor 4 raises the pressure of process fluid to a pressure from about 20 bar to about 275 bar.

Still referring to FIG. 1, a second compressor, in some cases called a hypercompressor 5, which may be a multi-stage compressor, is connected at its intake to the discharge of the primary compressor 4 as well as the second of the two recycle streams called the high pressure system recycle conduit 26. The hypercompressor 5 raises the pressure of the process fluid to an operating pressure of 1000 to 4000 bar.

The hypercompressor 5 of the disclosure may be a reciprocating plunger compressor due to the high compression ratio between the primary compressor outlet and the reactor as well as the high reactor operating pressure of the process fluid. The hypercompressors can be a single-stage compressor for lower reactor operating pressures or multi-stage compressors with interstage cooling between some or all of the stages for higher reactor operating pressures.

The process fluid being discharged by the hypercompressor 5 does not flow in a smooth, continuous manner but rather "pulses" with each stroke of the compressor. This occurs because the plunger within each stage intakes and discharges the compressible process fluid in a step-like manner. The resulting discharge flow pulses can result in pressure variations of ±10% or more in the operating pressure. A cycling discharge flow creating system pressure surges may have long-term negative effects on the mechanical integrity of process units such as the hypercompressor, the discharge line(s), and the reactor. In turn, reduction in mechanical integrity of these subsystems can affect overall operation stability and reliability in terms of online operations while the process stability can be influenced by the flow and pressure pulsations. Furthermore, it is possible due to discharge line geometry that individual discharge strokes of separate plungers from the same compressor (such as from a multi-stage compressor with several discharge points) may overlap each other (i.e., be partially or totally "in phase" with one another) resulting in an amplification in strength of the discharge pulsations upon combination in a common process fluid stream. It is good operational practice, therefore, to use static and active mechanical devices such as orifices and pulsation dampeners in the compressor discharge line(s) to minimize not only pressure surges but also minimize the effect of pressure pulse amplification in common discharge lines on the process and the reactor system equipment.

After pressurization by the hypercompressor 5, the process fluid is fed into the tube 2 through conduit 12 as an upstream process feed stream. In some disclosed processes, the process fluid is split and fed to tube 2 at different feed locations. In such processes, part of the process fluid is fed to tube 2 through conduit 12 as an upstream process feed stream to the first reaction zone and the other parts (depending on the number of splits made in the process fluid) would be fed to tube 2 as downstream process feed streams to the other reaction zones through various conduits 14. The other reaction zones are located lengthwise along tube 2 downstream of the first reaction zone. As previously stated, there may be more than one other reaction zone.

In processes where there are more than one reaction zone, one or more free-radical initiator or catalyst conduits 7 convey initiator or catalyst to tube 2 near or at the beginning of each reaction zone. The injection of initiators or catalysts, depending upon the desired ethylene-based polymer adduct, at process operating conditions, start the reaction of monomer/comonomer materials. In disclosed processes, the main product of such a reaction is an ethylene-based polymer and heat. Initiator or catalyst may be added to each reaction zone to improve conversion of the monomer (and comonomer, if included) in the process fluid as previously discussed. In a disclosed process, different initiators or catalysts may be added to the process fluid in different reaction zones to ensure the peak temperature is achieved close to the inspection point and to achieve various target peak temperatures.

The type of free radical initiator to be used in the processes is not critical. Examples of free radical initiators include oxygen-based initiators such as organic peroxides (PO). Preferred initiators are t-butyl peroxy pivalate, di-t-butyl peroxide, t-butyl peroxy acetate, and t-butyl peroxy-2-ethylhexanoate, and mixtures thereof. These organic peroxy initiators are used in conventional amounts of between 0.0001 and 0.01 weight percent based upon the weight of high pressure feed.

Suitable catalysts for use to polymerize other polymers which may be blended with the new LDPE disclosed herein include any compound or combination of compounds that is adapted for preparing polymers of the desired composition or type. Both heterogeneous and homogeneous catalysts, and combinations thereof, may be employed. In some embodiments, heterogeneous catalysts, including the well known Ziegler-Natta compositions, especially Group 4 metal halides supported on Group 2 metal halides or mixed halides and alkoxides and the well known chromium or vanadium based catalysts, may be used. In some embodiments, the catalysts for use may be homogeneous catalysts comprising a relatively pure organometallic compound or metal complex, especially compounds or complexes based on metals selected from Groups 3-10 or the Lanthanide series. If more than one catalyst is used in a system, it is preferred that any catalyst employed not significantly detrimentally affect the performance of another catalyst under the conditions of polymerization. Desirably, no catalyst is reduced in activity by greater than 25 percent, more preferably greater than 10 percent under the conditions of the polymerization. Examples of preferred catalyst systems may be found in U.S. Pat. No. 5,272,236 (Lai, et al.); U.S. Pat. No. 5,278,272 (Lai, et al.); U.S. Pat. No. 6,054,544 (Finlayson, et al.); U.S. Pat. No. 6,335,410 (Finlayson, et al.); U.S. Pat. No. 6,723,810 (Finlayson, et al.); PCT Published Application Nos. WO 2003/091262 (Boussie, et al.); 2007/136497 (Konze, et al.); 2007/136506 (Konze, et al.); 2007/136495 (Konze, et al.); and 2007/136496 (Aboelella, et al.). Other suitable catalysts may be found in U.S. Patent Publication No. 2007/0167578 (Arriola, et al.).

The free-radical polymerization reaction resulting in the disclosed ethylene-based polymer adduct occurs in each reaction zone where initiator or catalyst is present. The reaction is an exothermic reaction that generates a large quantity of heat. Without cooling, the adiabatic temperature rise in the process fluid and the ethylene-based polymer adduct (which absorbs and retains heat) would result in unfavorable reactions. Such reactions may include ethylene decomposition (where ethylene and polyethylene breaks down in a combustionless reaction into base products).

In some processes, the temperature of the process fluid is reduced by removing heat through the wall of tube 2 by inducing a heat flux with a heat removal medium. A heat removal medium is a fluid used to absorb heat and remove it from the tube reaction system 100, such as ethylene glycol, water, or air. When the heat removal medium is a liquid, a heat exchanger 30, which may be as simple as a 1-1 cooling "jacket" or a complex multipass refrigeration system, may be used to effect heat transfer and cool the process fluid and the ethylene-based polymer adduct. Non-limiting examples of heat exchangers and techniques for removing heat are described in Perry, Robert H., ed., *Perry's Chemical Engineers' Handbook*, Chp. 10, McGraw-Hill Book Co. (6th ed., 1984) and McCabe, Warren L, et al., *Unit Operations of Chemical Engineering*, McGraw-Hill, Inc. (5th ed., 1993). When the heat removal medium is a gas, fans may be used to convect the heat away from the reactor tube 2. The heat removal medium will have a mass flow rate, an inlet temperature, and an outlet temperature. When the heat removal medium is used to remove heat from the tube reaction system 100, the inlet temperature of the heat removal medium into the heat exchanger 30 is lower than the outlet temperature. The difference between the inlet and the outlet temperatures for a given mass flow rate is reflective of the heat removed from the process given the heat capacity of the heat removal medium and the ability of the tube 2 to transfer heat to the heat removal medium.

In some processes, chain transfer agents are added so as to blend as homogeneously as possible with the process fluid before introduction to the tube 2. Depending on the physical layout of the tube reactor system 100 and chemical characteristics of the process fluid and the CTAs, such blending may be achieved by injecting the CTAs at the inlet of the booster compressor 21 for the low pressure system recycle conduit 8, in the inlet of the primary compressor 4, in the inlet of the hypercompressor 5, at the outlet of the hypercompressor 5, at the inlet of the tube 2 or together with the first peroxide injection. For the process shown in FIG. 1, the CTAs are injected into reaction system 100 via CTA source 23 at the inlet of the primary compressor 4.

Although not shown in tube reactor system 100 to great detail in FIG. 1, selective feeding of CTAs to the tube reactor 2 is possible. In some processes, the process fluid is split into an upstream process feed stream and at least one downstream process feed stream after pressurization by the hypercompressor 5. In such cases, the CTAs may be fed into the tube 2 selectively by being injected into conduits 12 or 14 instead of using the CTA source 23 as shown in FIG. 1. In specific cases, the CTAs may be injected from CTA source 23 only into the upstream process feed stream via conduit 12. In processes where the hypercompressor 5 contains multiple stages or trains, the process fluid may be split into an upstream process feed and at least one downstream process feed stream at the inlet of the hypercompressor 5. In such cases, the CTAs may be selectively fed from CTA source 23 into either the upstream process feed or at least one downstream process feed before pressurization by the hypercompressor 5, or, as previously stated, into conduits 12 or 14 after pressurization. This flexibility in the disclosed process regarding the injection of CTAs from CTA source 23 permits selective injection of CTAs only into the first reaction zone, only into some or all of the at least one other reaction zones. It also permits the injection of different CTAs, including CTAs with different chain transfer constant (Cs) characteristics, to be injected from CTA source 23 into different zones to optimize reaction system performance and ethylene-based polymer adduct properties.

In some processes, the CTA source 23 may be comprised of several individual chain transfer agent sources. Although not shown in FIG. 1, the individual chain transfer agent sources may be distributed individually or combined into a common stream that is injected at a common point.

Referring back to FIG. 1 and the tube reactor system 100, a mixture of ethylene-based polymer formed from the reaction, unreacted monomer (and comonomer), and unused feeds, such as solvents and CTAs, or degradation and side reaction products, passes from the tube outlet 16 to the separations part of the process. The separating and recycling part of the tube reactor system 100 process includes a high-pressure separator (HPS) 18, which receives the product polymer and process fluid mixture from the outlet of the tube 2. The HPS 18 separates out most of the monomer from the ethylene-based polymer adduct. The tails of the HPS 18 conveys the polymer adduct and any remaining unreacted monomer/comonomer and other unused feeds that might be dissolved with the polymer adduct, to the low-pressure separator (LPS) 20. The higher pressure lights stream passes through the high pressure system recycle conduit 26, which may include a refining system 24 to cool and purify the stream and purge inert gases, and rejoins the process fluid passing from the primary compressor 4 to the hypercompressor 5.

Referring to FIG. 1, the LPS 20 separates any remaining monomer/comonomer and unused feeds from the polymer adduct by operating at slight atmospheric over pressure or vacuum conditions. The LPS 20 operates in a pressure range from about 4 to about 1.2 bar absolute to draw out entrained gases. The resulting ethylene-based polymer adduct, still molten from processing, passes by the tails of the LPS 20 to finishing steps, such as extrusion, quenching, and pelletization. The lights from LPS 20 pass through the low pressure system recycle conduit 8 where its pressure is boosted from around atmospheric pressure to at least the required pressure for proper operation of primary compressor 4. The low pressure booster compressor 21 may have a number of stages. The resulting product polymer is degassed of volatile reactants and overall system efficiency is improved by the recycle of unused monomer to the front of reaction system 100.

The recycle streams in both the low pressure system recycle conduit 8 and the high pressure system recycle conduit 26 typically contain a portion of chain transfer agents. More often than not, the high pressure system recycle conduit 26 will often contain a significant concentration of low-Cs chain transfer agent as it is not entirely consumed during the reaction process. In some disclosed processes, upon reaching steady-state production, the amount of fresh low-Cs CTA added to the process via CTA source 23 is relatively small compared to the amount present in the high and low pressure recycle conduits 26 and 8, respectively.

End-use products made using the disclosed ethylene-based polymers include all types of films (for example, blown, cast and extrusion coatings (monolayer or multilayer)), molded articles (for example, blow molded and rotomolded articles), wire and cable coatings and formulations, cross-linking applications, foams (for example, blown with open or closed cells), and other thermoplastic applications. The disclosed ethylene-based polymers are also useful as a blend component with other polyolefins, such as the polymers described in U.S. provisional Ser. No. 61/165,065, DOWLEX LLDPE, ENGAGE polyolefin elastomers, AFFINITY polyolefin plastomers, INFUSE Olefin Block Copolymers, VERSIFY plastomers and elastomers—all made by The Dow Chemical Company, and EXACT polymers, EXCEED polymers, VISTAMAXX polymers—both made by ExxonMobil. ASTUTE and SCLAIR made by Nova Chemicals also can be blended with the new LDPE disclosed herein.

The types of films that make be produced as end-use products from the disclosed ethylene-based polymers include lamination films, silage films, sealants, silobags, stretch films; biaxially oriented polyethylene, display packaging, shrink films, overwraps, masking films, release liners and heavy duty shipping sacks. Additionally, blown, cast and extrusion coatings (monolayer or multilayer) also may be produced using the disclosed ethylene-based polymers.

DEFINITIONS

The terms "blend" or "polymer blend" generally means a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art.

The term "comparable" means similar or like.

The term "composition" includes a mixture of materials which comprise the composition as well as reaction products and decomposition products formed from interaction and reaction between the materials of the composition.

The term "ethylene-based polymer" refers to a polymer that contains more than 50 mole percent polymerized ethylene monomer (based on the total amount of polymerizable monomers), and, optionally, may contain at least one comonomer. A homopolymer of ethylene is an ethylene-based polymer.

The term "ethylene/α-olefin interpolymer" refers to an interpolymer that contains more than 50 mole percent polymerized ethylene monomer (based on the total amount of polymerizable monomers), and at least one α-olefin.

The term "homopolymer" is a polymer that contains only a single type of monomer.

The term "interpolymer" refers to polymers prepared by the polymerization of at least two different types of monomers. The term interpolymer includes copolymers, usually employed to refer to polymers prepared from two different monomers, and polymers prepared from more than two different types of monomers, such as terpolymers.

The term "LDPE" may also be referred to as "high pressure ethylene polymer" or "highly branched polyethylene" and is defined to mean that the polymer is partly or entirely homopolymerized in autoclave or tubular reactors at pressures above 13,000 psig with the use of free-radical initiators, such as peroxides (see, for example, U.S. Pat. No. 4,599,392 (McKinney, et al.)).

The term "polymer" refers to a compound prepared by polymerizing monomers, whether of the same or a different type of monomer. The term polymer embraces the terms "homopolymer" and "interpolymer".

The term "standard deviation" is a quantity which measures the spread or dispersion of the distribution from a mean value. See Perry, Robert H., ed., *Perry's Chemical Engineers' Handbook*, McGraw-Hill Book Co. (6th ed., 1984); also Miller, Irwin, *Probability and Statistics for Engineers*, Prentice Hall (4th ed., 1990).

The terms "steady state" and "steady state condition(s)" are a condition where properties of any part of a system are constant during a process. See Lewis, Richard J., Sr., *Hawley's Condensed Chemical Dictionary*, Wiley-Interscience (15th ed., 2007); also Himmelblau, David M., *Basic Principles and Calculations in Chemical Engineering*, Prentice Hall (5th ed., 1989).

The term "GPC-LS characterization Y value" is defined as the same as the term "Log_LSCDF" and calculated mathematically in Equation 13-15 below as log(LSCDF)+3.5.

Testing Methods

Density

Samples for density measurement are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg.

Melt Strength

Melt strength measurements are conducted on a Gottfert Rheotens 71.97 (Goettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary radius) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s 2; capillary diameter=2.0 mm; capillary length=30 mm; and barrel diameter=12 mm.

Zero Shear Viscosity

Zero shear viscosity is determined by creep testing as discussed in Sammler, R. L., T. P. Karjala, W. Huang, M. A. Mangnus, L. G. Hazlitt, and M. S. Johnson, "Zero-Shear Viscosity/Molecular Weight Method for the Detection of Long-Chain Branching in Polyolefins", *SPE ANTEC Proceedings*, Chicago, 1023 (May 17-20, 2004).

A zero-shear viscosity value ($\eta_0$), in Pascal-seconds at 190° C., is obtained via a creep test that is conducted on an AR-G2 stress controlled rheometer (TA Instruments; New Castle, Del.) using 25-mm-diameter parallel plates maintained at 190° C. Two thousand ppm of antioxidant, a 2:1 mixture of IRGAFOS 168 and IRGANOX 1010 (Ciba Specialty Chemicals; Glattbrugg, Switzerland), is added to stabilize each sample prior to compression molding. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/minute. The creep time is set for 2 hours.

A low shear stress of 20 Pascals is applied for all of the samples to ensure that the shear rate is low enough to be in the Newtonian region. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached. The steady state shear rate is determined from the slope of the linear regression of all of the data points in the last 10% time window of the plot of ε vs. t, where ε is the strain. The zero-shear viscosity is determined from the ratio of the applied stress (20 Pascals) to the steady state shear rate.

A small amplitude oscillatory shear test is conducted before and after the creep test on the same specimen from 0.1 to 100 radians/second. The complex viscosity values of the two tests are compared. If the difference of the viscosity values at 0.1 radians/second is greater than 5%, the sample is considered to have degraded during the creep test, and the result is discarded.

DSC Crystallinity Determination

Differential Scanning Calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an autosampler module is used to perform the tests. During testing, a nitrogen purge gas flow of 50 ml/minute is used. Each sample is pressed into a thin film and melted in the press at about 175° C.; the melted sample is then air-cooled to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./minute cooling rate and held at −40° C. for 3 minutes. The sample is then heated to 150° C. at 10° C./minute heating rate. The cooling and second heating curves are recorded. The values determined are peak melting temperature ($T_m$), peak crystallization temperature ($T_c$), the heat of fusion ($H_f$), and the % crystallinity for polyethylene samples calculated using Equation 1:

$$\% \text{ Crystallinity} = [(H_f(J/g))/(292 \text{ J/g})] \times 100 \quad \text{(Eq. 1)}$$

The heat of fusion ($H_f$) and the peak melting temperature are reported from the second heat curve. The peak crystallization temperature is determined from the cooling curve.

Fourier Transform Infrared Spectroscopy (FTIR)

Unsaturations by FTIR were measured on a Thermo Nicolet model Nexus 470. The following ASTM procedures were followed:

| | |
|---|---|
| Methyls per 1000 C.: | ASTM D2238 |
| Trans per 1000 C.: | ASTM D6248 |
| Vinyls per 1000 C.: | ASTM D6248 |
| Vinylidenes per 1000 C.: | ASTM D3124 |

Film Testing Conditions

The following physical properties are measured on the films produced:

Total (Overall), Surface and Internal Haze: Samples measured for internal haze and overall haze are sampled and prepared according to ASTM D 1003. Internal haze was obtained via refractive index matching using mineral oil on both sides of the films. A Hazegard Plus (BYK-Gardner USA; Columbia, Md.) is used for testing. Surface haze is determined as the difference between overall haze and internal haze as shown in Equation 2. Surface haze tends to be related to the surface roughness of the film, where surface increases with increasing surface roughness. The surface haze to internal haze ratio is the surface haze value divided by the internal haze value as shown in Equation 3.

$$\text{Haze} = \text{Internal Haze} + \text{Surface Haze} \quad \text{(Eq. 2)}$$

$$S/I = \text{Surface Haze/Internal Haze} \quad \text{(Eq. 3)}$$

450 Gloss: ASTM D-2457.

1% Secant Modulus—MD (machine direction) and CD (cross direction): ASTM D-882.

MD and Cd Elmendorf Tear Strength: ASTM D-1922

MD and CD Tensile Strength: ASTM D-882

Dart Impact Strength: ASTM D-1709

Puncture Strength: Puncture is measured on a Instron Model 4201 with Sintech Testworks Software Version 3.10. The specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kim-wipe" after each specimen.

Shrink tension is measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008).

Determination of Maximum Output Rate of Blown Film

Film samples are collected at a controlled rate and at a maximum rate. The controlled rate is 250 lb/hr which equals an output rate of 10 lb/hr/inch of die circumference. Note the die diameter used for the maximum output trials is an 8" die so that for the controlled rate, as an example, the conversion between lb/hr and lb/hr/inch of die circumference is shown in Equation 4. Similarly, such an equation can be used for other rates, such as the maximum rate, by substituting the maximum rate in Equation 4 to determine the lb/hr/inch of die circumference.

$$\text{Lb/Hr/Inch of Die Circumference} = (250 \text{ Lb/Hr})/(8*\pi) = 10 \quad \text{(Eq. 4)}$$

The maximum rate for a given sample is determined by increasing the output rate to the point where bubble stability is the limiting factor. The extruder profile is maintained for both samples (standard rate and maximum rate), however the melt temperature is higher for the maximum rate samples due to the increased shear rate. The maximum bubble stability is determined by taking the bubble to the point where it would not stay seated in the air ring. At that point the rate is reduced to where the bubble is reseated in the air ring and then a sample is collected. The cooling on the bubble is adjusted by adjusting the air ring and maintaining the bubble. This is taken as the maximum output rate while maintaining bubble stability.

Note that all the film samples made for the LDPE-LLDPE blend maximum rate trials used a polymer processing aid (PPA). The PPA was added as 1.5% of a PPA masterbatch called CKAC-19 made by Ingenia Polymers, which contained 8% of Dynamar FX-5920A in PE carrier.

Monolayer films were produced. The die diameter is 8 inches, the die gap is 70 mils, the blow up ratio is 2.5, and internal bubble cooling is used.

Triple Detector Gel Permeation Chromatography (TDGPC)

The Triple Detector Gel Permeation Chromatography (3D-GPC or TDGPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering (LS) detector Model 2040, and a Viscotek (Houston, Tex.) 150R 4-capillary solution viscometer. A GPC with these latter two independent detectors and at least one of the former detectors is sometimes referred to as "3D-GPC" or "TDGPC" while the term "GPC" alone generally refers to conventional GPC. Depending on the sample, either the 15° angle or the 90° angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000, 000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 5 (as described in Williams and Ward, J. Polym. Sci., Polym. Letters, 6, 621 (1968)):

$$M_{polyethylene} = A \times (M_{polystyrene})^B \quad \text{(Eq. 5),}$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard, as outlined in the gpcBR Branching Index by 3D-GPC method, infra, and specifically Equation 12. Use of this polyethylene calibration method to obtain molecular weight values, such as the molecular weight distribution (MWD or $M_w/M_n$), and related statistics, is defined here as the modified method of Williams and Ward.

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log ($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards of known weight average molecular weight. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

gpcBR Branching Index by 3D-GPC

In the 3D-GPC configuration, the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations for polyethylene molecular weight and polyethylene intrinsic viscosity as a function of elution volume, as shown in Equations 6 and 7:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(Eq. 6)}$$

and $$[\eta]_{PE} = K_{PS} \cdot M_{PS}^{\alpha+1} / M_{PE}. \quad \text{(Eq. 7)}$$

The gpcBR branching index is a robust method for the characterization of long chain branching as described in Yau, Wallace W., "Examples of Using 3D-GPC—TREF for Polyolefin Characterization", Macromol. Symp., 2007, 257, 29-45. The index avoids the slice-by-slice 3D-GPC calculations traditionally used in the determination of g' values and branching frequency calculations in favor of whole polymer detector areas. From 3D-GPC data, one can obtain the sample bulk absolute weight average molecular weight ($M_{w, Abs}$) by the light scattering (LS) detector using the peak area method. The method avoids the slice-by-slice ratio of light scattering detector signal over the concentration detector signal as required in a traditional g' determination.

With 3D-GPC, absolute weight average molecular weight ("$M_{w, Abs}$") and intrinsic viscosity are also obtained independently using Equations 8 and 9:

$$M_W = \sum_i w_i M_i \quad \text{(Eq. 8)}$$

$$= \sum_i \left(\frac{C_i}{\sum_i C_i}\right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}$$

The area calculation in Equation 8 offers more precision because as an overall sample area it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation 9:

$$IV = [\eta] \quad \text{(Eq. 9)}$$

$$= \sum_i w_i IV_i$$

$$= \sum_i \left(\frac{C_i}{\sum_i C_i}\right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{\text{Conc. Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations 10 and 11:

$$Mw_{CC} = \sum_i \left(\frac{C_i}{\sum_i C_i}\right) M_i \quad \text{(Eq. 10)}$$

$$= \sum_i w_i M_{cc,i},$$

and $$[\eta]_{CC} = \sum_i \left(\frac{C_i}{\sum_i C_i}\right) IV_i \quad \text{(Eq. 11)}$$

$$= \sum_i w_i IV_{cc,i}.$$

Equation 12 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(Eq. 12)}$$

wherein [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The weight average molecular weight by light scattering (LS) using Equation (8) is commonly referred to as "absolute weight average molecular weight" or "$M_{w,\ Abs}$". The $M_{w,cc}$ from Equation (10) using conventional GPC molecular weight calibration curve ("conventional calibration") is often referred to as "polymer chain backbone molecular weight", "conventional weight average molecular weight", and "$M_{w,GPC}$".

All statistical values with the "cc" subscript are determined using their respective elution volumes, the corresponding conventional calibration as previously described, and the concentration ($C_i$) derived from the retention volume molecular weight calibration. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined using the procedure discussed previously, the procedure is repeated using the branched samples. The branched samples are analyzed using the final Mark-Houwink constants as the best "cc" calibration values and Equations 8-11 are applied.

The interpretation of gpcBR is straight forward. For linear polymers, gpcBR calculated from Equation 12 will be close to zero since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to a traditional "g' index" and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination.

GPC-LS Characterization

Analysis of a concentration-normalized LS chromatogram response curve for a particular sample using a pre-determined molecular weight range is useful in differentiating embodiment polymers from analogous and commercially available comparative low density ethylene-based polymers.

Figure 2:
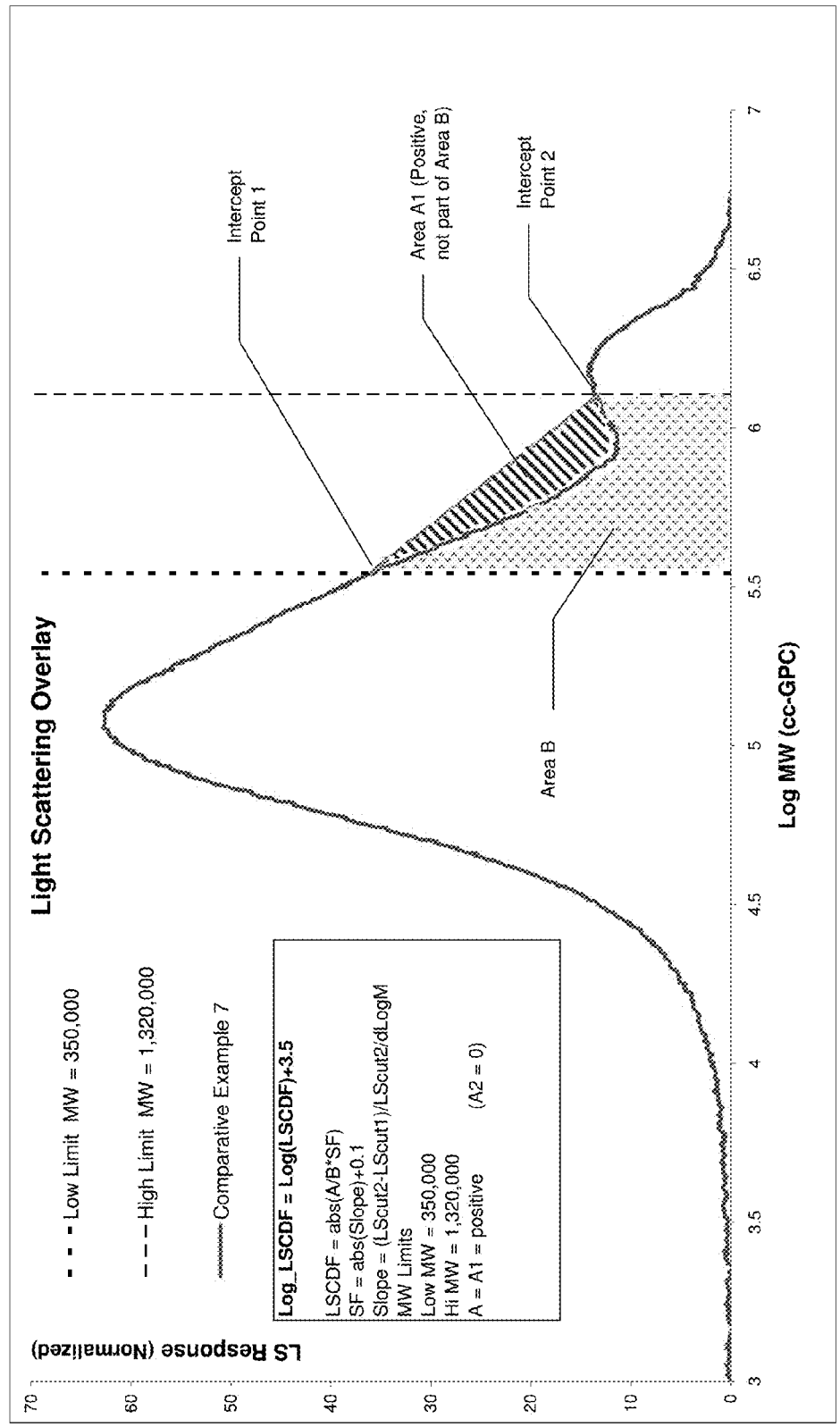
FIG. 2 is the Log_LSCDF structural descriptor with an A1-type positive area segment.
Figure 3:
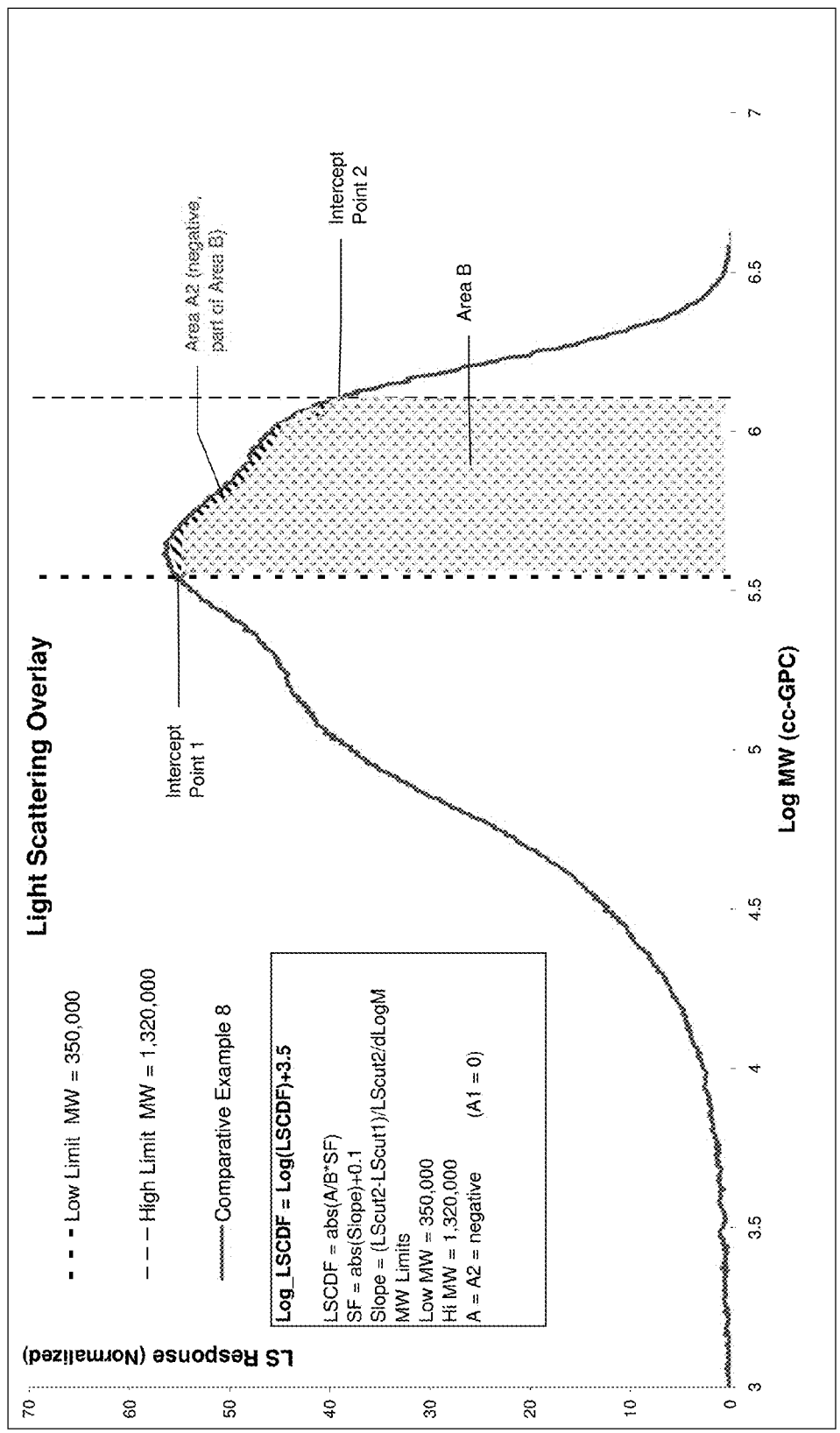
FIG. 3 is the Log_LSCDF structural descriptor with an A2-type negative area segment.
Figure 4:
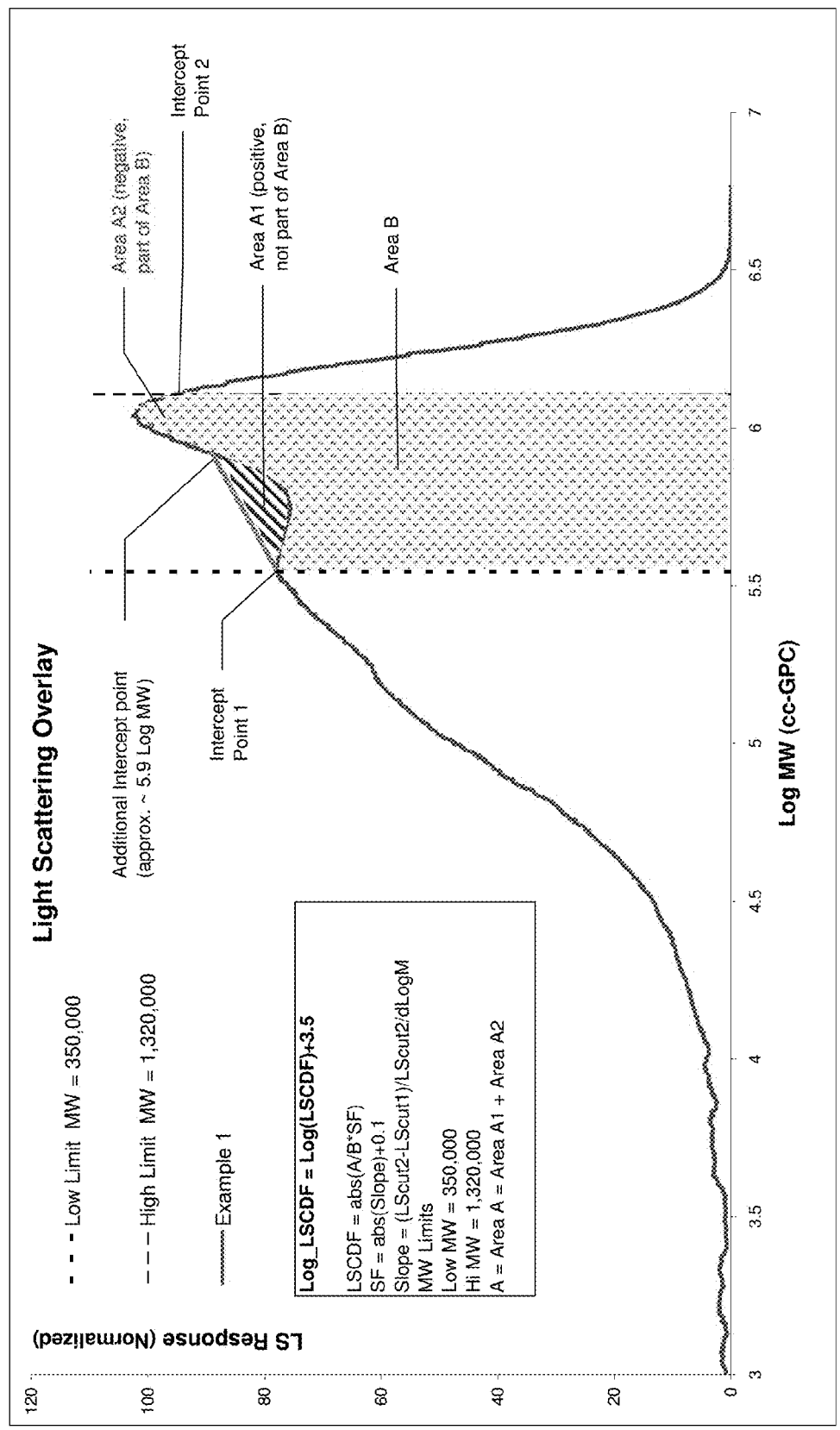
FIG. 4 is Log_LSCDF structural descriptor with both A1 and A2 type area segments.

The "GPC-LS Characterization" parameter, Y, is designed to capture the unique combination of MWD and the GPC-LS profile for a specific material. FIGS. 2-4 provide the examples and the guide for using the GPC-LS Characterization method to identify inventive embodiments.

An ethylene-based polymer that has long chain branching, such as low density ethylene-based polymers, can be differentiated by using an analysis technique called "GPC-LS Characterization". In the GPC-LS Characterization method, the determination is made using the light scattering (LS) detector response for a sample processed by a conventionally calibrated 3D-GPC ("cc-GPC") over a range of molecular weights of the sample. The molecular weights of the sample are converted to logarithm values for scaling purposes. The LS response is "concentration-normalized" so the LS response can be compared between samples, as it is known in the art that the unnormalized LS signals can vary greatly from sample to sample without normalization. When plotted, the logarithm values of range of the cc-GPC molecular weights and the concentration-normalized LS values form a concentration-normalized LS chromatogram curve such as the one shown in FIG. 2-4.

Once the concentration-normalized LS chromatogram curve is available, the determination of the GPC-LS Characterization value is straightforward. In the GPC-LS Characterization method, a GPC-LS Characterization value (Y) is determined using the following equations:

$$Y = \text{Log\_LSCDF} = \text{Log(LSCDF)} + 3.5 \tag{Eq. 13}$$

$$\text{LSCDF} = \text{Abs}(A/B * \text{SF}) \tag{Eq. 14}$$

$$\text{SF} = A \text{ Slope Function} = \text{Abs}(x) + 0.1 \tag{Eq. 15}$$

where, Abs( ) is the mathematical absolute value function and LSCDF represents the light scattering cumulative detector fraction.

Essentially, the GPC-LS Characterization value is a relationship between two associated areas (A and B) and an indexed slope of a line (x) between two points on the concentration-normalized LS chromatogram curve at the logarithmic values of two specified cc-GPC molecular weight values. The specified cc-GPC molecular weight values attempt to bracket a molecular weight fraction that is known to contain polymer chains with long chain branching.

The first step in the analysis is generation of the concentration-normalized LS chromatogram curve representing concentration-normalized LS response values versus the logarithmic values of cc-GPC molecular weights for the polymer being examined.

The second step is to draw a straight line between two points on the concentration-normalized LS chromatogram curve. The straight line and the points will provide the basis for determination of areas A and B. The two points, a first point and a second point, are located on the concentration-normalized LS chromatogram curve and represent the concentration-normalized LS response values (a first and a second concentration-normalized LS response values) at the logarithm values for two cc-GPC molecular weight values (a first and a second logarithmic cc-GPC molecular weight values). The first point (for example, Point 1 on FIG. 2) is defined as being on the concentration-normalized LS chromatogram curve (representing the first concentration-normalized LS response value) corresponding to the logarithm value of cc-GPC molecular weight 350,000 grams/mole (representing the first logarithmic cc-GPC molecular weight value), which is a value of approximately 5.544. The second point (Point 2 on FIG. 2) is defined as being on the concentration-normalized LS chromatogram curve at the concentration-normalized LS response value (representing the second concentration-normalized LS response value) corresponding to a logarithm value of cc-GPC molecular weight 1,320,000 grams/mole (representing the second logarithmic cc-GPC molecular weight value), which is a value of approximately 6.107. It is known in the art that differentiation in long chain branching typically is shown around 1M ($1 \times 10^6$) grams/mole cc-GPC molecular weight.

The third step is to determine the area A between the straight line and the concentration-normalized LS chromatogram curve between the two logarithmic cc-GPC molecular weight values. Area A is defined as being the value of A1 plus A2. In preferred embodiments, the area A is defined for the range of values between the logarithm value of cc-GPC molecular weight 350,000 grams/mole and the logarithm value of cc-GPC molecular weight 1,320,000 grams/mole.

A1 is defined as the area bound between the straight line and the normalized LS chromatogram curve where the concentration-normalized LS response value of the straight line is greater than the concentration-normalized LS response value for the concentration-normalized LS chromatogram curve between the two logarithmic cc-GPC molecular weight values.

As can be seen in FIG. 2, the area defined as A1 fills the entire range between the two logarithmic cc-GPC molecular weights; therefore A=A1. In many cases the straight line will be "above" the concentration-normalized LS chromatogram curve for the logarithmic cc-GPC molecular weight range and will not intersect with the concentration-normalized LS chromatogram curve except at Points 1 and 2. In these cases, A=A1=a positive value, and A2=0.

A2 is defined as the inverse of A1. A2 is the area bound between the straight line and the concentration-normalized LS chromatogram curve where the concentration-normalized LS response of the straight line is less than the concentration-normalized LS response for the concentration-normalized LS chromatogram curve between the two logarithmic cc-GPC molecular weight values. For the example shown in FIG. 3, A2 is the area between the concentration-normalized LS response curve and the straight line between Points 1 and 2. In these cases, A=A2=a negative value, and A1=0.

In some embodiments, as can be seen in FIG. 4, the straight line may intersect with the concentration-normalized LS chromatogram curve in at least one other point besides Points 1 and 2 (see FIG. 4 at "Additional Intersection Point"). In such situations, A1 is determined as previously defined. For the example shown in FIG. 4, A1 would be the positive area between the concentration-normalized LS chromatogram curve and the straight line between the logarithm cc-GPC molecular weight value of approximately 5.9 to the logarithm value of cc-GPC molecular weight 350,000 grams/mole. In such situations, A2 is determined as previously defined. For the example shown in FIG. 4, A2 is the negative area between the concentration-normalized LS response curve and the straight line between the logarithm cc-GPC molecular weight value of approximately 5.9 to the logarithm value of cc-GPC molecular weight 1,320,000 grams/mole.

In calculating a total value for A, A is again defined as the area A1 (positive value) plus the area A2 (negative value). In some embodiments, as can be seen graphically in FIG. 4, the total value for A can again be either positive or negative.

The fourth step is to determine the area B under the concentration-normalized LS chromatogram curve for the logarithmic cc-GPC molecular weight range. B is defined as the area under the concentration-normalized LS chromatogram curve between the two logarithmic cc-GPC molecular weight values. Area B does not depend upon the analysis of area A.

The fifth step is to determine the value of x, the slope indexing value. The value of the x is an indexing factor that accounts for the slope of the straight line established for determining areas A and B. The value of x is not the slope of the straight line; however, it does represent a value reflective of the difference between Points 1 and 2. The value of x is defined by Equation 16:

$$x = \frac{LSresponse_{(Point\ 2,CN)} - LSresponse_{(Point\ 1,CN)}}{LSresponse_{(Point\ 2,CN)}} \over {\log MW_{(Point\ 2,ccGPC)} - \log MW_{(Point\ 1,ccGPC)}},$$ (Eq. 16)

where "LS response" terms are the concentration-normalized LS response values for Points 1 and 2, respectively, and "log MW" terms are the logarithmic cc-GPC molecular weights for Points 1 and 2, respectively. In some embodiments, the straight line may intersect the normalized LS chromatogram curve at least once between Points 1 and 2.

Finally, once x, A, and B are established, the GPC-LS Characterization value (Y) is determined using the previously presented Equations 13-15, repeated below:

$$Y = Log\_LSCDF = Log(LSCDF) + 3.5 \quad (Eq.\ 13)$$

$$LSCDF = Abs(A/B * SF) \quad (Eq.\ 14)$$

$$SF = A\ Slope\ Function = Abs(x) + 0.1 \quad (Eq.\ 15)$$

where, Abs( ) is the mathematical absolute value function,

Process Information Related to Examples 1-3 (Ex. 1-3) and Comparative Examples 1-2 (CE 1-2)

In discussing the Examples and Comparative Examples, several terms are defined. There are three Example compositions and sets of process information for their creation: Example 1, Example 2, and Example 3. There are two Comparative Examples compositions and sets of process information. The process runs that created Comparative Examples 1 and 2 are analogous in that they are produced using the same process train as Examples 1, 2, and 3. Comparative Examples 1 and 2 are directly comparable with Examples 1, 2 and 3.

When process conditions are discussed and compared, the process conditions may be referred to by their product designation (e.g., process conditions for producing Example 1 product may be referred to as "the process of Example 1").

Figure 5:
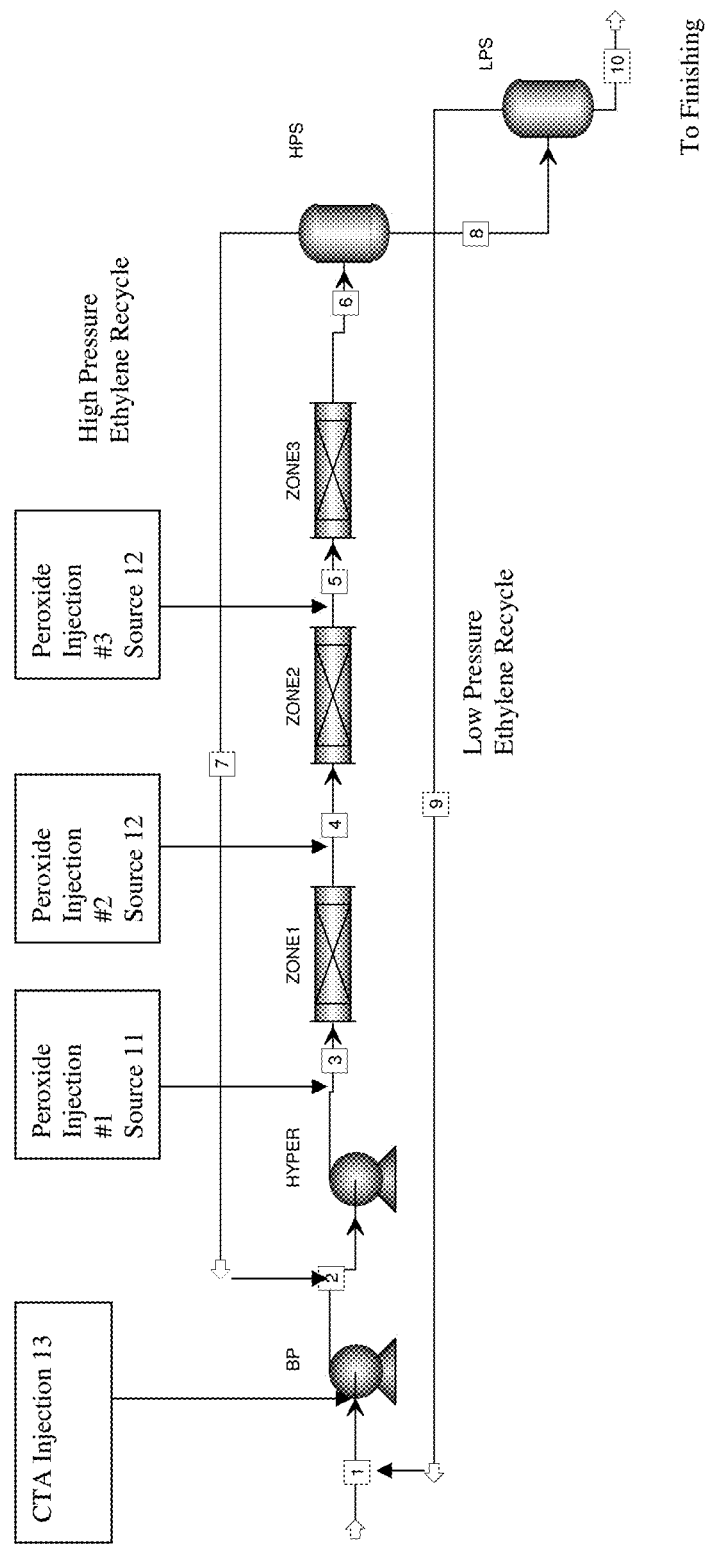
FIG. 5 is a schematic of the process used to make Examples 1-3 and Comparative Examples 1-2.

Examples 1, 2, and 3 as well as Comparative Examples 1 and 2 are produced on the same process reaction system; therefore, in referring to the same equipment between the runs, the physical process and its units are analogous to one another. FIG. 5 is a simple block diagram of the process reaction system used to produce the aforementioned Examples and Comparative Examples.

The process reaction system in FIG. 5 is a partially closed-loop dual recycle high-pressure, low density polyethylene production system. The process reaction system is comprised of a fresh ethylene feed conduit 1; a booster/primary compressor "BP", a hypercompressor "Hyper", a three zone tube reactor which is made up of 144 high pressure tubes that are 9.14 meters long. The tube reactor consists of a first reaction feed zone; a first peroxide initiator conduit 3 connected to a first peroxide initiator source #11; a second peroxide initiator conduit 4 connected to the second peroxide initiator source 12; a third peroxide initiator conduit 5 connected to a second peroxide initiator source 12; cooling jackets (using high pressure water) are mounted around the outer shell of the tube reactor and preheater; a high pressure separator "HPS"; a high pressure recycle line 7; a low pressure separator "LPS"; a low pressure recycle line 9; and a chain transfer agent CTA feed system 13.

The tube reactor further comprises three reaction zones demarcated by the location of peroxide injection points. The tube reactor has a length of about 1316 meters. The first reaction zone feed is attached to the front of the tube reactor at 0 meters and feeds a portion of the process fluid into the first reaction zone. The first reaction zone starts at injection point #1 (3), which is located about 120 meters downtube of the front of the tube reactor and ends at injection point #2 (4). The first peroxide initiator is connected to the tube reactor at injection point #1 (3). The second reaction zone starts at injection point #2 (4), which is about 520 meters downtube from the front of the tube reactor. The second reaction zone ends at injection point #3 (5). The third reaction zone starts at injection point #3 (5), which is located about 890 meters downtube from the front of the tube reactor.

The preheater which is the first 13 tubes starting at 0 meters and all of the reaction zones have an inner tube diameter of 5 centimeters. For all the Examples and the Comparative Examples, 100% of the fresh ethylene and ethylene recycle are directed to the first reaction zone via the first reaction zone feed conduit. This is referred to as an all front gas tubular reactor.

For all the Examples and the Comparative Examples, a mixture containing t-butyl peroxy-2 ethylhexanoate (TBPO), di-t-butyl peroxide (DTBP), tert-butyl peroxypivalate (PIV) and an iso-paraffinic hydrocarbon solvent (boiling range>179° C.) are used as the initiator mixture for the first injection point. For injection points #2 and #3, a mixture containing DTBP, and TPO and the iso-paraffinic hydrocarbon solvent are used. Table 1 shows the flows of the peroxide initiator and solvent solution used for each of the trial runs.

TABLE 1

Peroxide initiator flows in kilograms per hour at each injection point for Examples 1-3 (Ex. 1-Ex. 3) and Comparative Examples 1-2 (CE 1-CE2).

Organic peroxide (PO)

| Injection Location | Material | Ex. 1 (kg/hr) | CE 1 (kg/hr) | CE 2 (kg/hr) | Ex. 2 (kg/hr) | Ex. 3 (kg/hr) |
|---|---|---|---|---|---|---|
| Injection Point #1 | TBPO | 1.13 | 1.13 | 1.20 | 1.27 | 1.41 |
| | DTBP | 0.56 | 0.57 | 0.60 | 0.64 | 0.70 |
| | PIV | 2.70 | 2.71 | 2.87 | 3.05 | 3.38 |
| | Solvent | 18.11 | 18.19 | 19.27 | 20.48 | 22.69 |
| Injection Point #2 | TBPO | 0.42 | 0.35 | 0.34 | 0.40 | 0.31 |
| | DTBP | 0.84 | 0.70 | 0.68 | 0.81 | 0.61 |
| | Solvent | 19.65 | 16.45 | 15.90 | 18.98 | 14.44 |
| Injection Point #3 | TBPO | 0.49 | 0.26 | 0.21 | 0.42 | 0.43 |
| | DTBP | 0.98 | 0.52 | 0.43 | 0.84 | 0.87 |
| | Solvent | 23.12 | 12.13 | 10.01 | 19.68 | 20.34 |

For all examples and comparative examples, propylene was used as the chain transfer agent (CTA). The propylene is injected into the ethylene stream at the discharge drum of the first stage booster. The composition of the CTA feed to the process is adjusted between the comparative examples and Examples 1 and 2 for the process runs. This is done to maintain the melt index of the product. The peak temperatures for each of the three reaction zones were increased to maximize molecular weight distribution. The reactor tube process conditions used to manufacture Examples 1, 2 and 3 and Comparative Examples 1, and 2 are given in Table 2.

Figure 6:
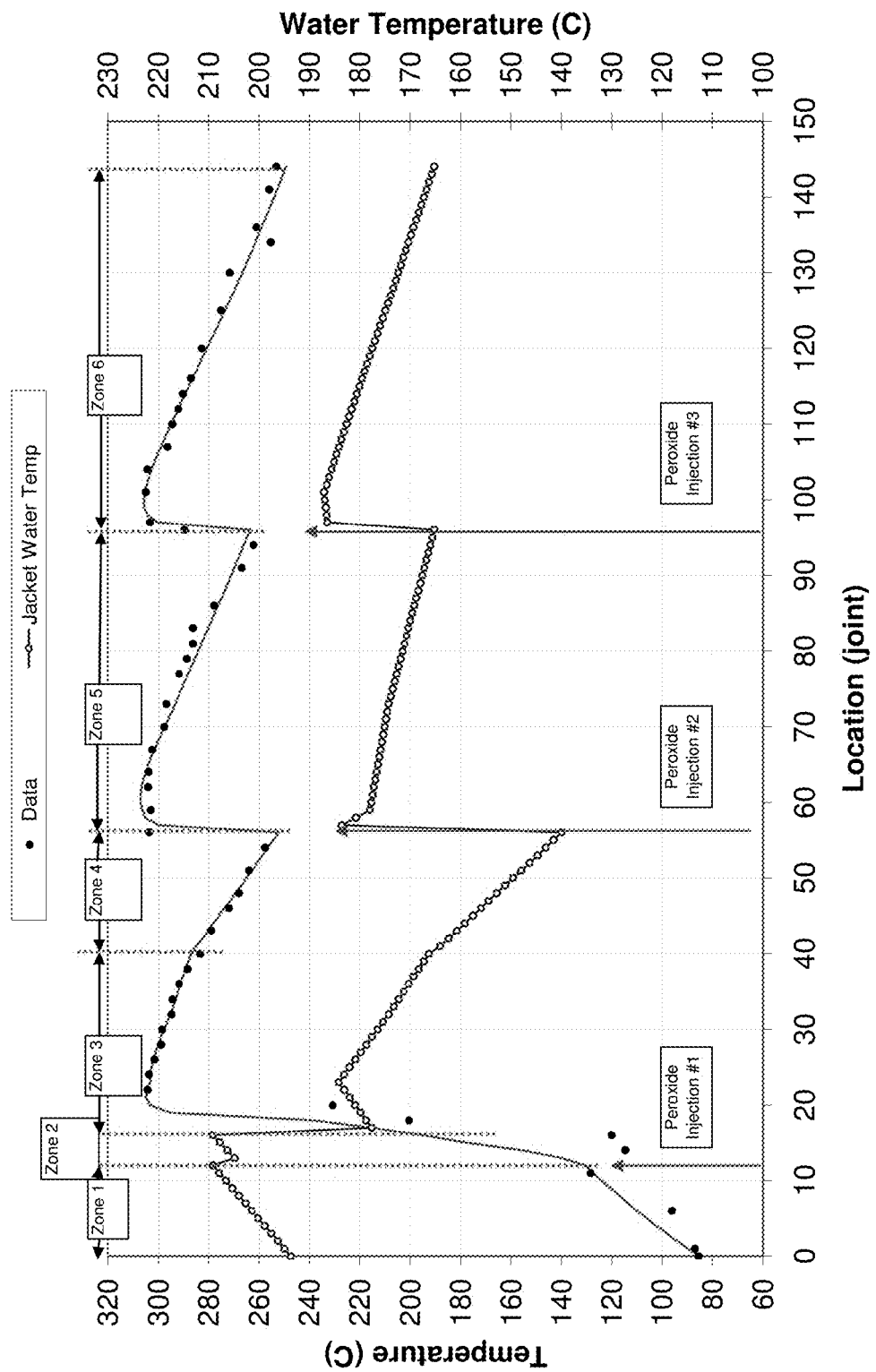
FIG. 6 is a schematic of the temperatures and zones used to make Example 1.

Note that from Table 2 and FIG. 6, BW system 1 goes to Zone 3, BW system 2 goes to zones 4, 5, and 6, and BW system 3 goes to Zone 1 and 2. FIG. 6 is the temperature profile of the tube reactor showing the reactor details of Example 1. The graph shows the three reaction zones with respect to the peroxide injections. The x-axis shows the joint location between tubes and the y-axis is temperature for the reaction and for the boiling water. Thermocouples are used to measure the reaction temperature down the tube during production. The reaction peaks for each zone are controlled by adjusting peroxide flows to each of the reaction zones. The peak temperatures are then used to control the MWD of the product.

Characterization of Examples 1-3 and Comparative Examples 1-2

Characterization properties of Examples 1-3 and Comparative Examples 1-2 is shown in Tables 3-5. From Table 3, at nearly equivalent melt index, the examples of the invention have higher melt strength values than their comparative examples as a result of their broader MWD shown in Table 3. This increased melt strength is translated into this material being an effective polymer to aid in the increased output of a film when used alone or in combination with other polymers to produce a film, for example on a blown film line. Also, at nearly equivalent melt index, the examples of the invention have a higher zero shear viscosity than their comparative examples. This is also related to the ability of this material to provide improved bubble stability during film formation, such as on a blown film line.

Per Table 4, the examples of this invention have lower vinyl per 1000 C levels and higher methyl per 1000 C levels than the comparative examples.

Table 5 shows the TDGPC properties of the examples and comparative examples, using the same comparative examples shown in Table 3 and 4. The examples have higher Mz or high molecular weight tail values, broader MWD (Mw/Mn), and lower Log_LSCDF.

TABLE 2

Process conditions used to make Examples 1-3 (Ex. 1-Ex. 3) and Comparative Examples 1-2 (CE 1-CE2).

| Process Variables | Ex. 1 | CE 1 | Ex. 2 | Ex. 3 | CE 2 |
|---|---|---|---|---|---|
| Reactor Pressure (Psig) | 38,300 | 38,300 | 38,300 | 38,300 | 38,300 |
| Zone 1 Initiation Temp (° C.) | 128 | 128 | 125 | 125 | 125 |
| Zone 1 Peak Temp )° C.) | 305 | 298 | 305 | 310 | 298 |
| Zone 2 Initiation Temp (° C.) | 257 | 254 | 259 | 273 | 245 |
| Zone 2 Peak Temp (° C.) | 305 | 298 | 305 | 308 | 298 |
| Zone 3 Initiation Temp (° C.) | 262 | 248 | 266 | 267 | 258 |
| Zone 3 Peak Temp (° C.) | 305 | 290 | 305 | 305 | 290 |
| Fresh ethylene Flow (lb/hr) | 28,730 | 26,400 | 27,200 | 26,400 | 25,700 |
| Ethylene throughput to Tube Reactor (lb/hr) | 100,300 | 99,950 | 100,800 | 100,800 | 100,800 |
| Ethylene Conversion (%) | 28.6 | 26.4 | 27.4 | 26.5 | 25.1 |
| Propylene Flow (lb/hr) | 244 | 315 | 164 | 140 | 249 |
| Ethylene Purge Flow (lb/hr) | 500 | 500 | 500 | 600 | 500 |
| Recycle Propylene Conc. (wt %) | 0.5 | 0.9 | 0.2 | 0.2 | 0.7 |
| BW Drum Press. System 1 (Psig) | 90 | 90 | 120 | 120 | 140 |
| BW Drum Temp. System 1 (° C.) | 166 | 166 | 176 | 176 | 182 |
| BW Drum Press. System 2 (Psig) | 90 | 90 | 120 | 120 | 220 |
| BW Drum Temp. System 2 (° C.) | 165 | 165 | 175 | 175 | 200 |
| BW Drum Press. System 3 (Psig) | 270 | 270 | 270 | 270 | 270 |
| BW Drum Temp. System 3 (° C.) | 210 | 210 | 210 | 210 | 210 |

Note that BW stands for boiling water.

TABLE 3

Melt index, density, DSC (thermal) properties, and melt strength of Examples 1-3 and Comparative Examples 1-2.

|  | Melt Index ($I_2$ at 190° C.) | Density (g/cc) | $T_m$ (° C.) | Heat of Fusion (J/g) | % Crystallinity | $T_c$ (° C.) | Melt strength at 190° C. (cN) | Zero Shear Viscosity (Pa-s) |
|---|---|---|---|---|---|---|---|---|
| Example 1 | 0.58 | 0.9211 | 109.6 | 143.7 | 49.2 | 97.4 | 14.4 | 42,508 |
| Example 2 | 0.64 | 0.9205 | 110.4 | 145.4 | 49.8 | 98.2 | 12.1 | 38,292 |
| Example 3 | 0.67 | 0.9206 | 110.7 | 143.0 | 49.0 | 98.4 | 12.0 | 38,707 |
| CE 1 | 0.52 | 0.9220 | 109.9 | 144.3 | 49.4 | 98.3 | 13.3 | 42,699 |
| CE 2 | 0.68 | 0.9212 | 110.5 | 145.2 | 49.7 | 98.7 | 11.9 | 35,765 |

TABLE 4

FTIR properties of Examples 1-3 and Comparative Examples 1-2.

|  | Trans/ 1000 C. | Vinyls/ 1000 C. | Methyls/ 1000 C. | Vinylidenes/ 1000 C. |
|---|---|---|---|---|
| Example 1 | 0.057 | 0.143 | 17.1 | 0.041 |
| Example 2 | 0.045 | 0.111 | 20.2 | 0.073 |
| Example 3 | 0.037 | 0.102 | 19.6 | 0.073 |
| CE 1 | 0.050 | 0.171 | 16.3 | 0.032 |
| CE 2 | 0.035 | 0.157 | 15.6 | 0.051 |

TABLE 5

TDGPC properties of Examples 1-3 and Comparative Examples 1-2.

| Sample | cc-GPC Mn (g/mol) | cc-GPC Mw (g/mol) | cc-GPC Mz (g/mol) | cc-GPC Mw/Mn | Mw (LS-abs)/ Mw (cc-GPC) | IVw dl/g | g' | gpcBR | Y = Log_LSCDF = Log (LSCDF) + 3.5 |
|---|---|---|---|---|---|---|---|---|---|
| Ex. 1 | 11,990 | 102,160 | 365,200 | 8.52 | 2.37 | 0.99 | 0.58 | 1.87 | 1.04 |
| Ex. 2 | 12,360 | 104,160 | 367,200 | 8.43 | 2.08 | 1.03 | 0.60 | 1.58 | 0.90 |
| Ex. 3 | 12,090 | 105,390 | 387,000 | 8.72 | 2.08 | 1.00 | 0.59 | 1.68 | 1.18 |
| CE 1 | 12,640 | 97,240 | 366,000 | 7.69 | 2.34 | 0.99 | 0.60 | 1.78 | 1.61 |
| CE 2 | 13,760 | 95,460 | 331,100 | 6.94 | 2.09 | 0.98 | 0.61 | 1.58 | 1.85 |

Figure 7:
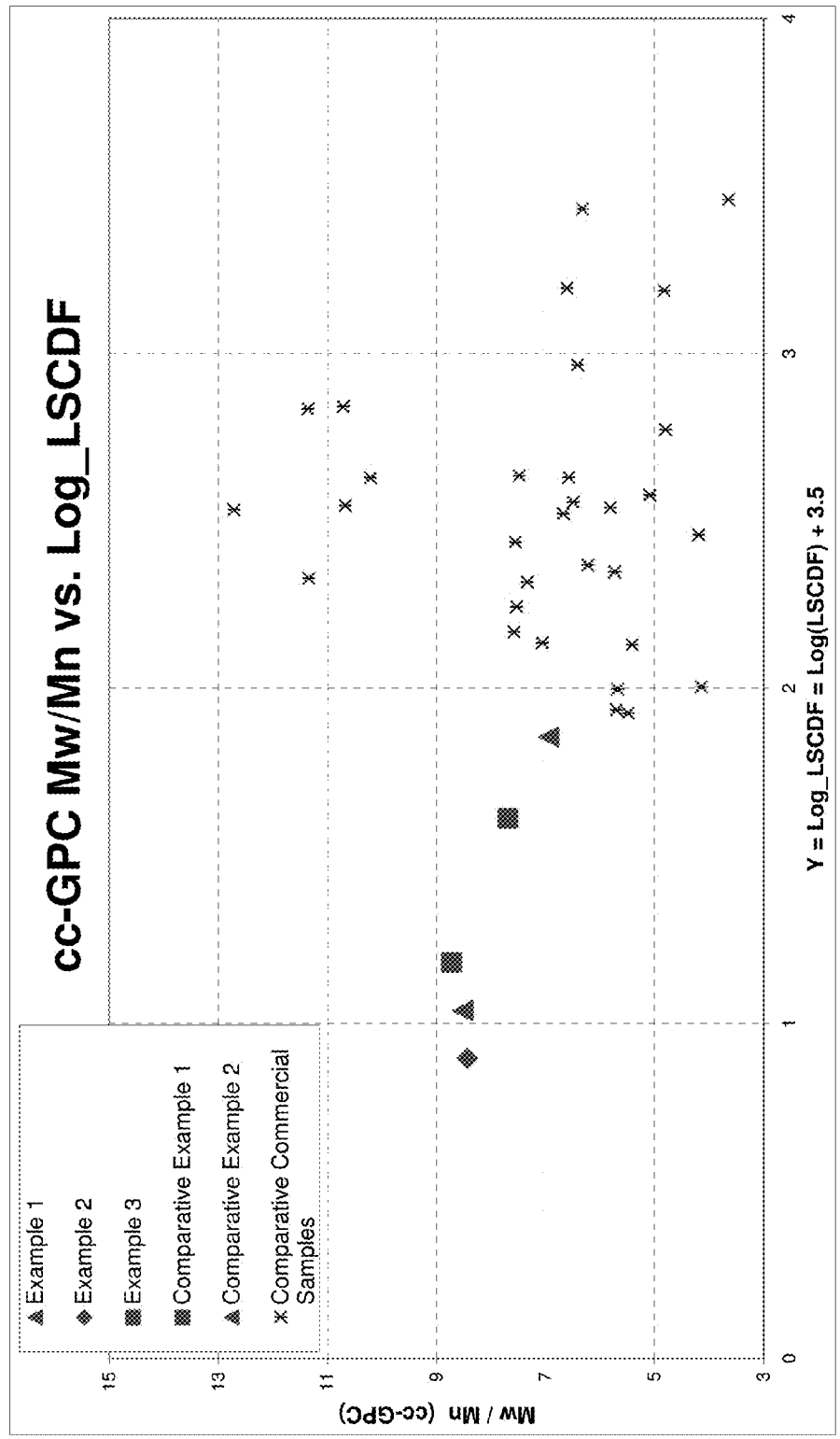
FIG. 7 is the molecular weight distribution vs. the Log_LSCDF for the examples of this invention and comparative examples.

For the Log_LSCDF, additional comparative examples have been chosen to show the uniqueness of the Examples as compared to comparative examples. These data are shown in Table 6 and plotted in FIG. 7. As shown in FIG. 7, the inventive examples show a unique relationship with Y=Log (LSCDF)+3.5 and also with Mw/Mn. In particular, the inventive examples have a much lower Y than any of the comparative samples and in general have a higher Mw/Mn. The Y is less than about 2, preferably less than about 1.5, and most preferably less than about 1.2. The unique structure as demonstrated by their low GPC-LS characterization Y values of the inventive embodiments is clearly shown in Table 6, where a large number of LDPE resins of similar MI range are compared. The comparative examples in Table 6 covers a MI range from 0.24 to 8.19. The comparative examples in Table 6 also covers a broad range of branching level with gpcBR values ranging from about 0.62 to about 4.72. The comparative examples in Table 6 also covers a broad range of molecular weights with the cc-Mw values ranging from about 70,000 to about 260,000 Daltons.

TABLE 6

Summary of melt index, density, melt strength, TDGPC properties, and "Log (LSCDF) + 3.5" of Examples and Comparative Examples used in FIG. 7.

| Sample | Melt Index, I2 (190 C., g/10 min) | Density (g/cc) | Melt Strength (cN) | cc-GPC Mn (g/mol) | cc-GPC Mw (g/mol) | cc-GPC Mz (g/mol) | cc-GPC Mw/Mn | Mw (LS-abs)/ Mw (cc-GPC) | IVw dl/g | g' | gpcBR | Y = Log_LSCDF = Log(LSCDF) + 3.5 |
|---|---|---|---|---|---|---|---|---|---|---|---|---|
| Ex. 1 | 0.58 | 0.9211 | 14.4 | 11,990 | 102,160 | 365,200 | 8.52 | 2.37 | 0.99 | 0.581 | 1.867 | 1.04 |
| Ex. 2 | 0.64 | 0.9205 | 12.1 | 12,360 | 104,160 | 367,200 | 8.43 | 2.08 | 1.03 | 0.603 | 1.584 | 0.90 |
| Ex. 3 | 0.67 | 0.9206 | 12.0 | 12,090 | 105,390 | 387,000 | 8.72 | 2.08 | 1.00 | 0.593 | 1.682 | 1.18 |
| CE 1 | 0.52 | 0.9220 | 13.3 | 12,640 | 97,240 | 366,000 | 7.69 | 2.34 | 0.99 | 0.603 | 1.778 | 1.61 |
| CE 2 | 0.68 | 0.9212 | 11.9 | 13,760 | 95,460 | 331,100 | 6.94 | 2.09 | 0.98 | 0.613 | 1.576 | 1.85 |
| CE 3 | 2.03 | 0.9238 | 6.9 | 17,360 | 83,770 | 220,900 | 4.83 | 1.68 | 0.94 | 0.645 | 1.189 | 3.19 |
| CE 4 | 0.81 | 0.9243 | 14.1 | 20,180 | 114,580 | 344,600 | 5.68 | 2.22 | 0.99 | 0.577 | 0.928 | 2.00 |
| CE 5 | 2.18 | 0.9217 | 6.6 | 13,930 | 79,850 | 305,300 | 5.73 | 2.47 | 0.89 | 0.623 | 1.682 | 2.35 |

TABLE 6-continued

Summary of melt index, density, melt strength, TDGPC properties, and "Log (LSCDF) + 3.5" of Examples and Comparative Examples used in FIG. 7.

| Sample | Melt Index, I2 (190 C., g/10 min) | Density (g/cc) | Melt Strength (cN) | cc-GPC Mn (g/mol) | cc-GPC Mw (g/mol) | cc-GPC Mz (g/mol) | cc-GPC Mw/Mn | Mw (LS-abs)/ Mw (cc-GPC) | IVw dl/g | g' | gpcBR | Y = Log_LSCDF = Log(LSCDF) + 3.5 |
|---|---|---|---|---|---|---|---|---|---|---|---|---|
| CE 6 | 1.99 | 0.9197 | 8.7 | 15,380 | 83,280 | 254,700 | 5.41 | 1.87 | 0.95 | 0.636 | 1.172 | 2.13 |
| CE 7 | 0.75 | 0.924 | 9.6 | 20,750 | 75,630 | 165.100 | 3.64 | 1.64 | 1.01 | 0.659 | 0.759 | 3.46 |
| CE 8 | 0.70 | 0.9235 | 10.8 | 14,030 | 87,160 | 291,700 | 6.21 | 1.76 | 0.97 | 0.676 | 1.270 | 2.37 |
| CE 9 | 0.72 | 0.9232 | 14.0 | 13,660 | 103,200 | 438,700 | 7.55 | 2.44 | 1.02 | 0.608 | 1.872 | 2.44 |
| CE 10 | 0.89 | 0.9240 | 13.1 | 16,130 | 88,500 | 302,100 | 5.49 | 2.49 | 0.99 | 0.592 | 1.749 | 1.93 |
| CE 11 | 0.24 | 0.9215 | 15.1 | 14,730 | 111,700 | 429,400 | 7.58 | 2.26 | 1.08 | 0.617 | 1.625 | 2.17 |
| CE 12 | 4.06 | 0.9215 | 8.7 | 12,640 | 135,370 | 574,700 | 10.71 | 2.56 | 0.91 | 0.574 | 2.944 | 2.84 |
| CE 13 | 0.38 | 0.9182 | 29.8 | 20,320 | 258,500 | 922,100 | 12.72 | 3.90 | 1.31 | 0.431 | 4.717 | 2.53 |
| CE 14 | 0.67 | 0.9222 | 14.0 | 16,130 | 93,670 | 249,100 | 5.81 | 1.95 | 1.00 | 0.618 | 0.689 | 2.54 |
| CE 15 | 0.84 | 0.9273 | 13.9 | 13,000 | 97,890 | 359,200 | 7.53 | 2.03 | 1.02 | 0.630 | 1.431 | 2.24 |
| CE 16 | 0.94 | 0.9233 | 13.5 | 14,830 | 93,840 | 259,300 | 6.33 | 1.62 | 1.00 | 0.623 | 1.109 | 3.43 |
| CE 17 | 0.61 | 0.9269 | 13.4 | 15,170 | 101,180 | 359,100 | 6.67 | 1.89 | 1.01 | 0.635 | 1.401 | 2.52 |
| CE 18 | 0.60 | 0.928 | 16.2 | 14,960 | 105,620 | 382,500 | 7.06 | 1.95 | 1.03 | 0.610 | 1.563 | 2.14 |
| CE 19 | 1.00 | 0.923 | 12.3 | 13,450 | 88,500 | 364,900 | 6.58 | 2.20 | 0.95 | 0.619 | 0.620 | 2.63 |
| CE 20 | 0.79 | 0.924 | 14.4 | 18,650 | 119,470 | 325,300 | 6.41 | 2.63 | 0.98 | 0.618 | 1.017 | 2.97 |
| CE 21 | 0.9 | 0.93 | 7.3 | 13,620 | 69,280 | 223,400 | 5.09 | 1.65 | 0.92 | 0.704 | 0.878 | 2.58 |
| CE 22 | 0.78 | 0.9232 | 11.87 | 20,160 | 84,440 | 210,300 | 4.19 | 2.03 | 1.04 | 0.615 | 1.069 | 2.46 |
| CE 23 | 0.76 | 0.9248 | 18.1 | 14,310 | 92,840 | 314,600 | 6.49 | 2.07 | 1.06 | 0.620 | 1.750 | 2.56 |
| CE 24 | 0.76 | 0.9243 | 13.1 | 13,550 | 89,550 | 379,800 | 6.61 | 2.78 | 1.04 | 0.663 | 1.832 | 3.19 |
| CE 25 | 0.70 | 0.9221 | 16.4 | 20,830 | 86,200 | 329,200 | 4.14 | 2.14 | 1.04 | 0.606 | 1.249 | 2.00 |
| CE 26 | 0.91 | 0.9235 | 13.3 | 13,640 | 100,010 | 281,300 | 7.33 | 2.02 | 1.00 | 0.650 | 1.700 | 2.32 |
| CE 27 | 0.81 | 0.9215 | 19.3 | 17,920 | 102,190 | 404,400 | 5.70 | 2.10 | 1.06 | 0.557 | 0.723 | 1.94 |
| CE 28 | 0.83 | 0.9206 | 13.3 | 18,990 | 91,090 | 365,300 | 4.80 | 2.06 | 1.00 | 0.651 | 0.669 | 2.77 |
| CE 29 | 0.73 | 0.9236 | 19.2 | 13,410 | 100,320 | 366,200 | 7.48 | 1.99 | 1.05 | 0.568 | 0.748 | 2.63 |
| CE 30 | 5.42 | 0.9184 | 9.6 | 14,300 | 145,940 | 615,900 | 10.21 | 3.02 | 1.00 | 0.549 | 3.351 | 2.63 |
| CE 31 | 4.63 | 0.9201 | 7.0 | 10,950 | 116,800 | 496,800 | 10.67 | 2.36 | 0.90 | 0.580 | 2.408 | 2.55 |
| CE 32 | 8.19 | 0.9184 | 5.45 | 12,030 | 136,640 | 556,700 | 11.36 | 3.06 | 0.89 | 0.543 | 3.604 | 2.83 |
| CE 33 | 2.12 | 0.9178 | 16.5 | 15,910 | 180,480 | 736,800 | 11.34 | 3.22 | 1.10 | 0.505 | 3.517 | 2.33 |

Film Properties of Examples and Comparative Examples

Figure 8:
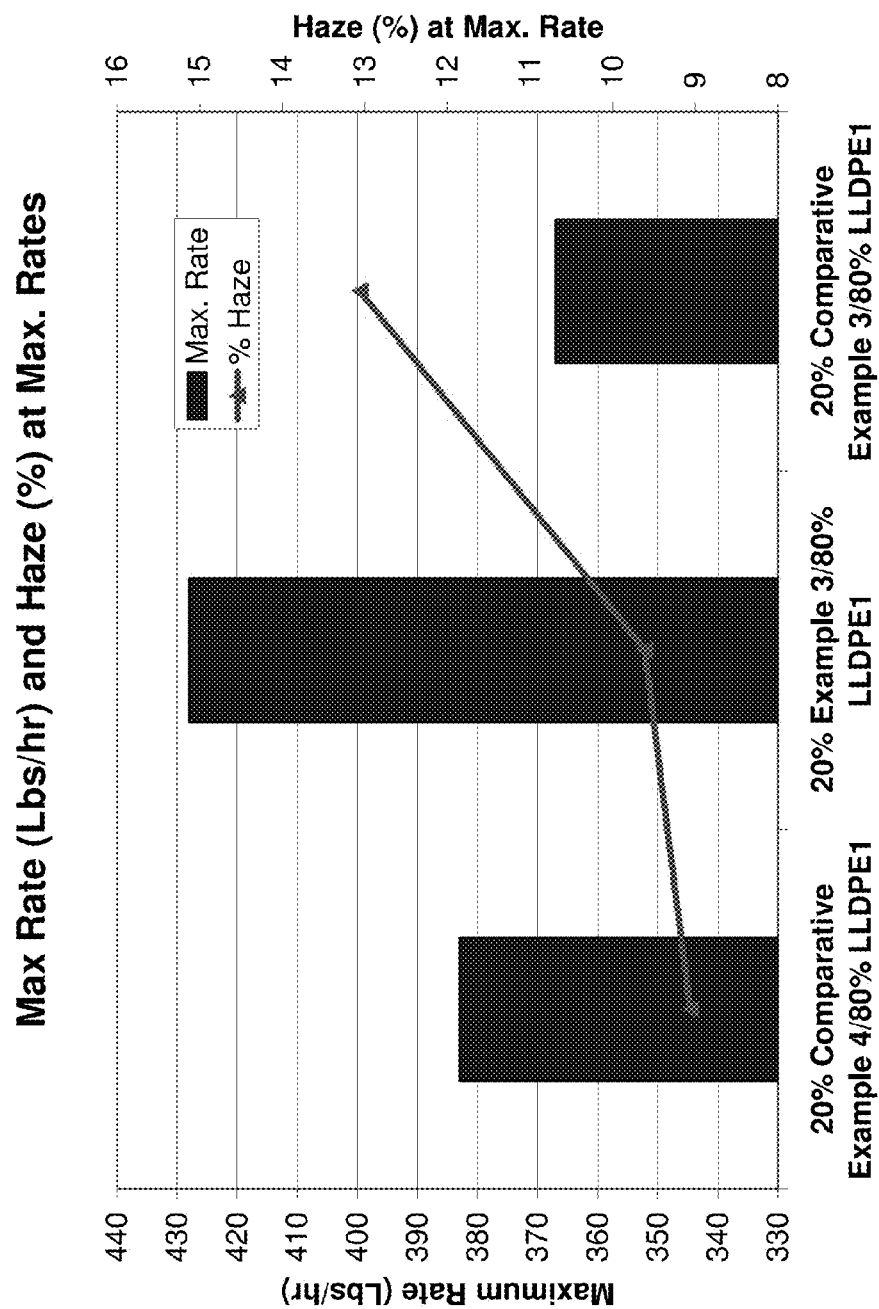
FIG. 8 is the maximum rate and haze for examples and comparative examples with LLDPE1 from Table 10.
Figure 9:
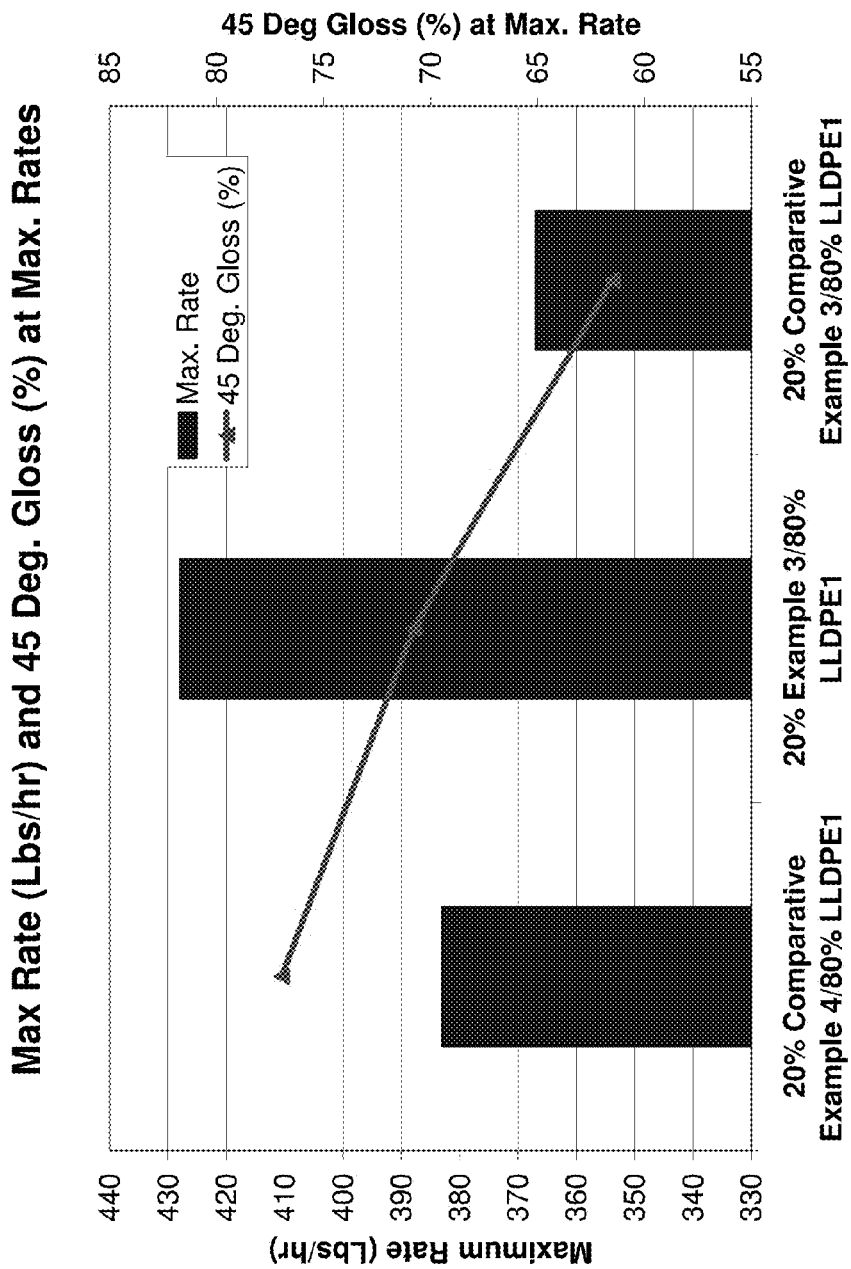
FIG. 9 is the maximum rate and gloss for examples and comparative examples with LLDPE1 from Table 10.
Figure 10:
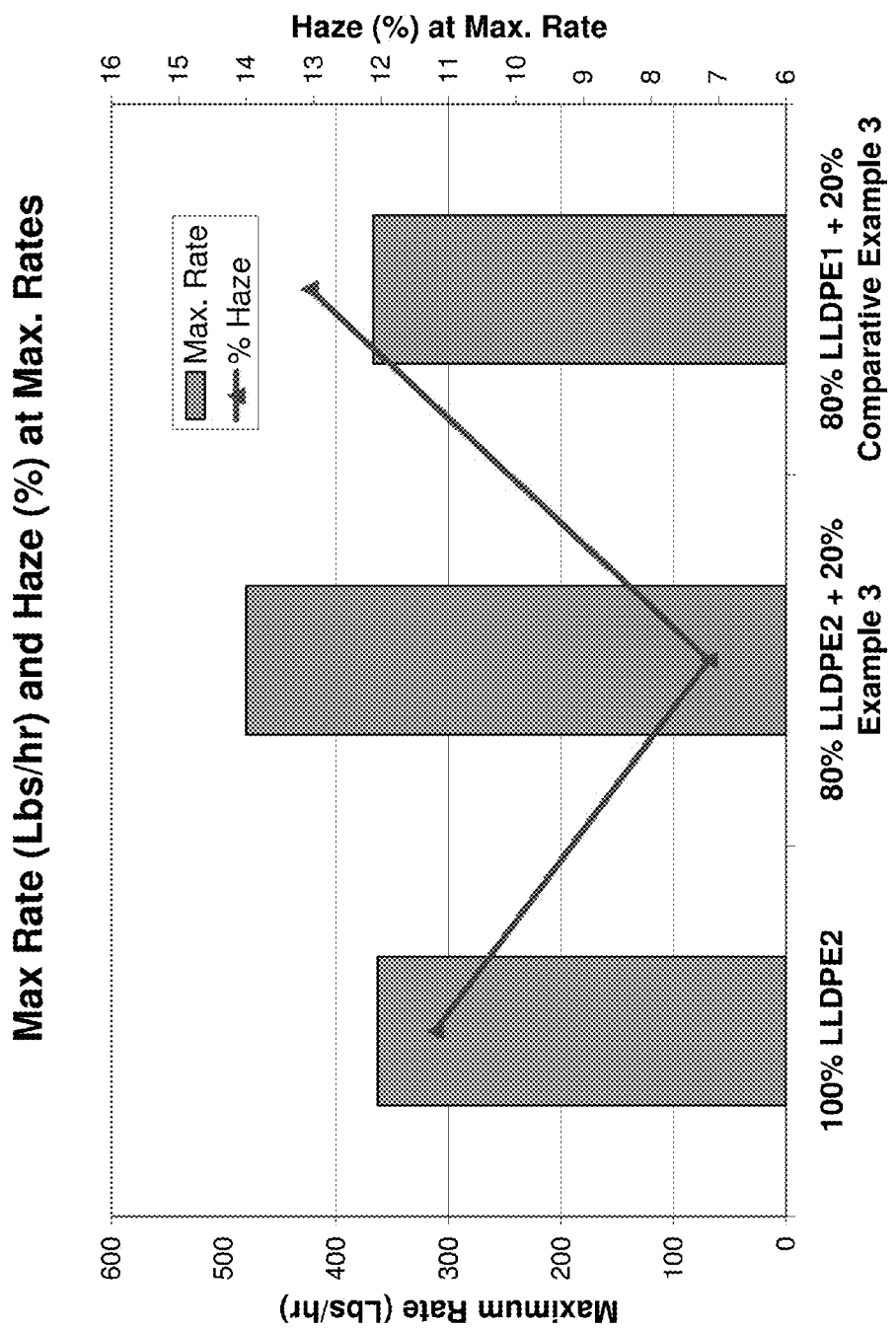
FIG. 10 is the maximum rate and haze for examples and comparative examples with LLDPE1 and LLDPE2 from Table 10.
Figure 11:
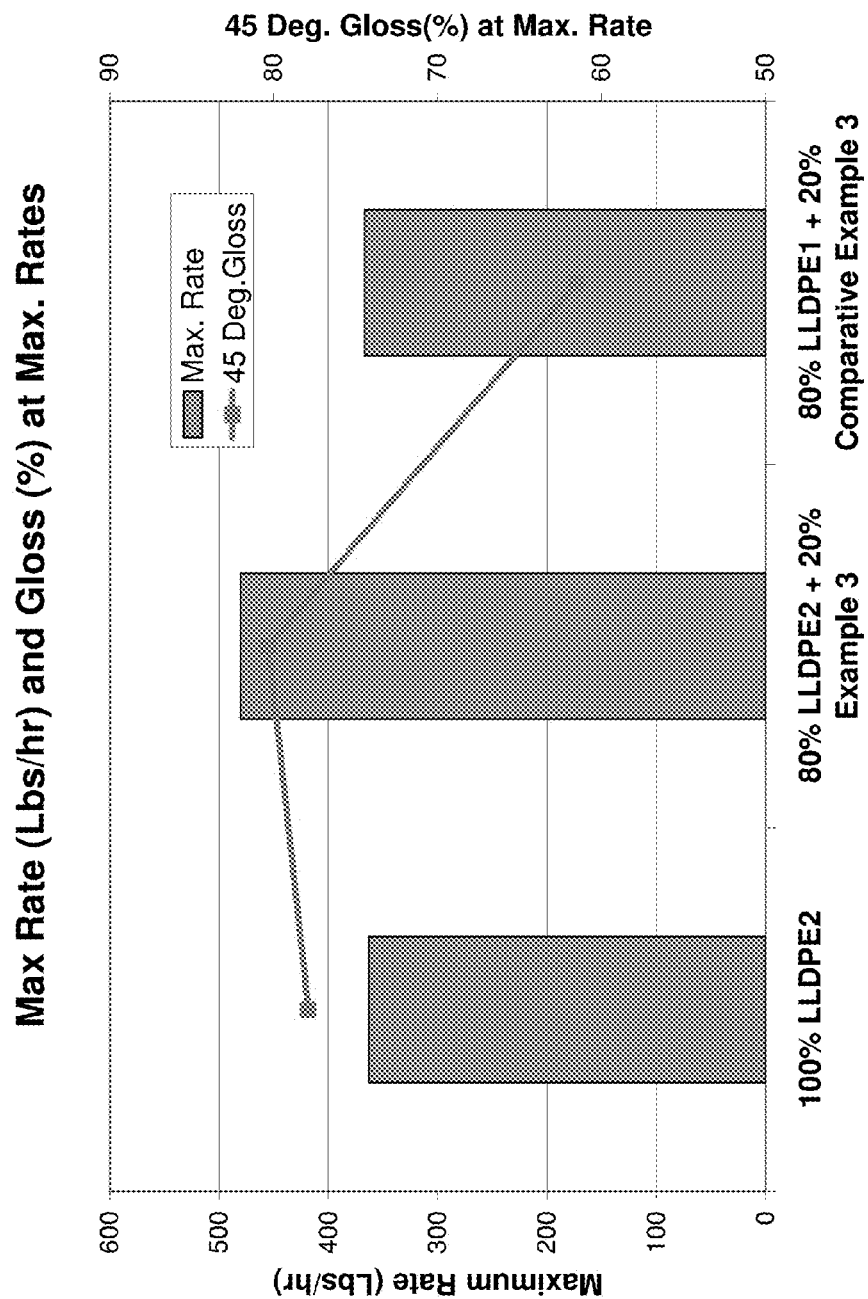
FIG. 11 is the maximum rate and gloss for examples and comparative examples with LLDPE1 and LLDPE2 from Table 10.

Film properties from the maximum output rate trials are shown in Tables 7-12 and FIGS. 8-11. Example 3 when blended at 20% with LLDPE1 gave the highest output on the blown film line (428 lb/hr from Table 7) while maintaining bubble stability, as compared to all other comparative examples made with LLDPE1. The LLDPE resins are described in more detail in Table 8. The comparative examples are described in more detail in Table 6. At the same time, the haze of the films with 80% LLDPE1 and 20% Example 3 was very low. When Example 3 was blended at 20% with LLDPE2, even higher output was obtained on the blown film line (480 lb/hr) and this combination also had the lowest haze (7.1%) of all the films in this study. FIG. 8 shows the combination of good output and haze for Example 3 compared to comparative examples (lower haze is improved or better haze) and FIG. 8 shows a similar plot for the maximum rate and 45 degree gloss (higher output and higher gloss preferred). FIGS. 10 and 11 show results for the maximum rate, haze and gloss when Example 3 is blended with LLDPE2, showing the advantageously high output, low haze, and high gloss.

Table 9 shows comparisons similar to those shown in Table 8, but instead of being at the maximum rate, Table 9 shows results at a lower comparable rate of 250 lb/hr or 10 lb/hr/inch of die circumference. The inventive examples still show the lowest haze of any examples at the 20% level in LLDPE1 of 7% with Example 2. In LLDPE2, the haze is even further reduced to 6% when 20% of Example 3 is used.

The process conditions used to make the films in Tables 7 and 9 are shown in Table 10. The barrel temperatures T1-T5 refer to temperatures closer to the feed of the extruder (T1) and closer to the die end (T5), respectively.

Table 11 shows results for 2 mil thick and 1 mil thick films made at maximum rates. At both thicknesses, the blend with 20% of Example 1 showed the highest output as compared to the LLDPE alone or when 20% of Comparative Example 1 or Comparative Example 9 is used. The haze is excellent in the 2 mil film with 20% of Example 1 at 4.7% as is the 45 degree gloss at 86%.

TABLE 7

Physical properties of films made at 2 mil thickness at maximum rate.

| Sample Description | Gloss 45 Degree (%) | Total Haze (%) | Puncture (ft-lb/in³) | CD 1% Secant Modulus (psi) | MD 1% Secant Modulus (psi) | CD Elmendorf Tear Type B (g) | MD Elmendorf Tear Type B (g) | Dart A (g) | CD Break Stress (psi) | MD Break Stress (psi) | Max Rate (lb/hr) |
|---|---|---|---|---|---|---|---|---|---|---|---|
| 80% LLDPE1 + 20% Ex. 2 | 77.4 | 8.8 | 192 | 43,604 | 38,055 | 1,554 | 542 | 238 | 4,657 | 5,523 | 419 |
| 80% LLDPE1 + 20% Ex. 3 | 70.8 | 9.6 | 177 | 41,471 | 38,597 | 1,506 | 546 | 223 | 4,921 | 5,945 | 428 |
| 90% LLDPE1 + 10% Ex. 3 | 63.1 | 12.0 | 197 | 39,711 | 37,261 | 1,247 | 689 | 259 | 4,953 | 6,557 | 391 |
| 70% LLDPE1 + 30% Ex. 3 | 77.4 | 8.4 | 154 | 42,871 | 37,506 | 1,399 | 297 | 199 | 4,759 | 5,266 | 440 |
| 80% LLDPE1 + 20% CE 2 | 76.7 | 8.6 | 165 | 42,527 | 38,281 | 1,385 | 464 | 217 | 3,967 | 5,530 | 404 |
| 80% LLDPE1 + 20% CE 3 | 61.5 | 13.1 | 150 | 41,260 | 37,494 | 1,229 | 697 | 250 | 4,513 | 5,708 | 367 |

TABLE 7-continued

Physical properties of films made at 2 mil thickness at maximum rate.

| Sample Description | Gloss 45 Degree (%) | Total Haze (%) | Puncture (ft-lb/in³) | CD 1% Secant Modulus (psi) | MD 1% Secant Modulus (psi) | CD Elmendorf Tear Type B (g) | MD Elmendorf Tear Type B (g) | Dart A (g) | CD Break Stress (psi) | MD Break Stress (psi) | Max Rate (lb/hr) |
|---|---|---|---|---|---|---|---|---|---|---|---|
| 80% LLDPE1 + 20% CE 4 | 77.0 | 9.1 | 168 | 41,710 | 38,300 | 1,421 | 492 | 253 | 4,836 | 5,267 | 383 |
| 80% LLDPE1 + 20% CE 5 | 71.6 | 11.4 | 164 | 42,960 | 38,818 | 1,297 | 612 | 226 | 4,937 | 6,293 | 370 |
| 80% LLDPE1 + 20% CE 6 | 67.2 | 12.4 | 199 | 44,151 | 38,391 | 1,236 | 585 | 229 | 5,060 | 5,764 | 364 |
| 100% LLDPE1 | 61.7 | 15.0 | 244 | 44,123 | 36,656 | 1,172 | 798 | 262 | 5,358 | 6,560 | 319 |
| 100% LLDPE2 | 77.9 | 11.2 | 291 | 36,784 | 31,670 | 1,118 | 835 | 850 | 5,794 | 7,130 | 363 |
| 80% LLDPE2 + 20% Ex. 3 | 80.3 | 7.1 | 216 | 40,756 | 35,460 | 1,310 | 331 | 283 | 4,937 | 6,293 | 480 |
| 80% LLDPE3 + 20% Ex. 3 | 80.7 | 7.1 | 242 | 37,940 | 33,867 | 1,438 | 543 | 301 | 5,060 | 5,764 | 402 |

TABLE 8

Descriptions of LLDPE1-LLDPE3.

| LLDPE | Description | $I_2$ (190° C.) | Density (g/cc) |
|---|---|---|---|
| LLDPE1 | DOWLEX 2045G | 1.0 | 0.920 |
| LLDPE2 | Made as in U.S. provisional serial number 61/165,065 | 0.8 | 0.917 |
| LLDPE3 | Made as in U.S. provisional serial number 61/165,065 | 1.3 | 0.917 |

TABLE 9

Physical properties of films made at 2 mil at standard rate of 250 lb/hr or 10 lb/hr/inch of die circumference (8" die).

| Sample Description | 45 Degree Gloss (%) | Total Haze (%) | Puncture (ft-lb/in³) | CD 1% Secant Modulus (psi) | MD 1% Secant Modulus (psi) | CD Elmendorf Tear Type B (g) | MD Elmendorf Tear Type B (g) | CD Break Stress (psi) | MD Break Stress (psi) | Dart A (g) |
|---|---|---|---|---|---|---|---|---|---|---|
| 80% LLDPE1 + 20% Ex. 2 | 83.4 | 7.0 | 206 | 41,876 | 36,621 | 1,363 | 490 | 4,301 | 5,821 | 220 |
| 80% LLDPE1 + 20% Ex. 3 | 81.8 | 7.7 | 173 | 44,293 | 37,864 | 1,404 | 425 | 4,934 | 5,534 | 202 |
| 90% LLDPE1 + 10% Ex. 3 | 80.0 | 8.7 | 200 | 42,647 | 37,241 | 1,363 | 590 | 4,878 | 6,467 | 247 |
| 70% LLDPE1 + 30% Ex. 3 | 82.1 | 7.7 | 174 | 43,943 | 38,389 | 1,466 | 382 | 4,967 | 5,387 | 199 |
| 80% LLDPE1 + 20% CE 2 | 81.8 | 8.1 | 185 | 44,192 | 38,535 | 1,363 | 437 | 5,049 | 5,628 | 214 |
| 80% LLDPE 1 + 20% CE 3 | 84.9 | 8.1 | 116 | 42,037 | 37,247 | 1,214 | 565 | 4,527 | 5,387 | 226 |
| 80% LLDPE1 + 20% CE 4 | 79.3 | 8.1 | 203 | 42,187 | 37,471 | 1,352 | 603 | 5,362 | 5,028 | 253 |
| 80% LLDPE1 + 20% CE 5 | 82.1 | 8.9 | 210 | 42,159 | 37,973 | 1,261 | 597 | 5,904 | 5,492 | 256 |
| 80% LLDPE1 + 20% CE 6 | 86.7 | 8.9 | 150 | 43,948 | 36,534 | 1,283 | 472 | NM | NM | 208 |
| 100% LLDPE1 | 63.3 | 14.5 | 242 | 43,318 | 36,422 | 1,117 | 836 | 5,576 | 6,321 | 280 |
| 100% LLDPE2 | 68.0 | 10.6 | 263 | 38,146 | 32,275 | 1,196 | 883 | 6,368 | 7,805 | 850 |
| 80% LLDPE2 + 20% Ex. 3 | 87.8 | 6.0 | 214 | 35,720 | 32,760 | 1,328 | 441 | 5,375 | 5,285 | 415 |
| 80% LLDPE3 + 20% Ex. 3 | 83.2 | 7.2 | 207 | 37,931 | 33,400 | 1,354 | 517 | 5,142 | 5,815 | 253 |

TABLE 10

Blown film process conditions related to the films properties discussed in Tables 7 and 9.

| Sample Description | Frost Line Height (FLH-inch) | Barrel T1 (F.) | Barrel T2 (F.) | Barrel T3 (F.) | Barrel T4 (F.) | Barrel T5 (F.) | Screen T (F.) | Adapter T (F.) | Block T (F.) | Lower Die T (F.) | Upper Die T (F.) | Melt Temp. (F.) |
|---|---|---|---|---|---|---|---|---|---|---|---|---|
| 80% LLDPE1 + 20% Ex. 2 | 60 | 384 | 422 | 391 | 376 | 376 | 443 | 450 | 444 | 450 | 452 | 463 |
| 80% LLDPE1 + 20% Ex. 3 | 61 | 383 | 422 | 390 | 376 | 376 | 442 | 451 | 450 | 450 | 452 | 454 |
| 90% LLDPE1 + 10% Ex. 3 | 54 | 379 | 419 | 391 | 375 | 376 | 444 | 450 | 448 | 450 | 452 | 453 |
| 70% LLDPE1 + 30% Ex. 3 | 62 | 375 | 419 | 388 | 374 | 375 | 449 | 450 | 450 | 450 | 451 | 454 |
| 80% LLDPE1 + 20% CE 2 | 59 | 382 | 422 | 393 | 376 | 375 | 439 | 451 | 454 | 450 | 452 | 463 |
| 80% LLDPE1 + 20% CE 3 | 57 | 382 | 421 | 391 | 377 | 375 | 437 | 451 | 452 | 450 | 451 | 455 |
| 80% LLDPE1 + 20% CE4 | 57 | 382 | 421 | 391 | 376 | 376 | 437 | 450 | 451 | 450 | 451 | 460 |
| 80% LLDPE1 + 20% CE 5 | 55 | 384 | 424 | 395 | 375 | 375 | 433 | 451 | 456 | 451 | 452 | 453 |
| 80% LLDPE1 + 20% CE 6 | 55 | 380 | 423 | 395 | 375 | 375 | 423 | 452 | 453 | 450 | 450 | 454 |
| 100% LLDPE1 | 39 | 378 | 421 | 392 | 377 | 376 | 440 | 451 | 454 | 450 | 451 | 439 |
| 100% LLDPE2 | 55 | 378 | 421 | 389 | 376 | 375 | 455 | 450 | 442 | 450 | 452 | 463 |

TABLE 10-continued

Blown film process conditions related to the films properties discussed in Tables 7 and 9.

| Sample Description | Frost Line Height (FLH-inch) | Barrel T1 (F.) | Barrel T2 (F.) | Barrel T3 (F.) | Barrel T4 (F.) | Barrel T5 (F.) | Screen T (F.) | Adapter T (F.) | Block T (F.) | Lower Die T (F.) | Upper Die T (F.) | Melt Temp. (F.) |
|---|---|---|---|---|---|---|---|---|---|---|---|---|
| 80% LLDPE2 + 20% Ex. 3 | 61 | 385 | 421 | 390 | 373 | 377 | 453 | 450 | 443 | 450 | 452 | 480 |
| 80% LLDPE3 + 20% Ex. 3 | 55 | 385 | 421 | 390 | 373 | 377 | 453 | 450 | 443 | 450 | 452 | 454 |

Blow-up ratio of 2.5:1 for all films above

TABLE 11

Physical properties of films made at 2 mil and 1 mil thickness at maximum rate.

| Sample Description | 45 Degree Gloss (%) | Haze (%) | Puncture (ft * lbf/in³) | CD 1% Secant Modulus (psi) | MD 1% Secant Modulus (psi) | CD Elmendorf Tear (g) | MD Elmendorf Tear (g) | CD Break Stress (psi) | MD Break Stress (psi) | Maximum Rate (lb/hr) | Thickness of film (mil) |
|---|---|---|---|---|---|---|---|---|---|---|---|
| 100% LLDPE1 | 58 | 14.0 | 117 | 39,621 | 36,531 | 691 | 360 | 5,252 | 6,658 | 299 | 2 |
| 80% LLDPE1 + 20% CE 1 | 84 | 5.1 | 168 | 44,860 | 40,184 | 905 | 133 | 6,056 | 6,382 | 375 | 2 |
| 80% LLDPE1 + 20% Ex. 1 | 86 | 4.7 | 175 | 46,479 | 40,570 | 834 | 128 | 5,608 | 6,693 | 402 | 2 |
| 80% LLDPE + 20% CE 9 | 90 | 3.9 | 189 | 46,085 | 39,187 | 872 | 105 | 5,793 | 7,040 | 355 | 2 |
| 100% LLDPE1 | 49 | 22.8 | 99 | 40,285 | 35,476 | 1,386 | 439 | 6,078 | 6,546 | 321 | 1 |
| 80% LLDPE1 + 20% CE 1 | 81 | 6.7 | 95 | 34,233 | 31,395 | 1,322 | 413 | 6,101 | 5,874 | 381 | 1 |
| 80% LLDPE1 + 20% Ex. 1 | 78 | 7.6 | 102 | 37,613 | 31,240 | 1,465 | 456 | 5,995 | 6,732 | 410 | 1 |
| 80% LLDPE1 + 20% CE 9 | 72 | 9.2 | 77 | 35,471 | 31,091 | 1,264 | 494 | 6,103 | 6,105 | 375 | 1 |

TABLE 12

Blown film process conditions related to the films properties discussed in Table 11.

| Sample Description | Film Thickness (mils) | Frost Line Height (FLH-inch) | Barrel 1 Temp. (F.) | Barrel 2 Temp. (F.) | Barrel 3 Temp. (F.) | Barrel 4 Temp. (F.) | Barrel 5 Temp. (F.) | Screen Temp (F.) | Adapter Temp (F.) | Block Temp (F.) | Lower Die Temp (F.) | Upper Die Temp (F.) | Melt Temp. (F.) | Melt Strength (cN) |
|---|---|---|---|---|---|---|---|---|---|---|---|---|---|---|
| 100% LLDPE1 | 2 | NM | 376 | 420 | 390 | 375 | 374 | 441 | 451 | 445 | 450 | 449 | 434 | NM |
| 80% LLDPE1 + 20% CE 1 | 2 | 47 | 379 | 421 | 391 | 375 | 374 | 447 | 450 | 458 | 450 | 451 | 446 | 10.6 |
| 80% LLDPE1 + 20% Ex. 1 | 2 | 46 | 376 | 421 | 391 | 371 | 375 | 448 | 450 | 441 | 450 | 452 | 461 | 10.8 |
| 80% LLDPE1 + 20% CE 9 | 2 | 50 | 374 | 419 | 389 | 375 | 376 | 449 | 450 | 449 | 450 | 451 | 457 | 9.1 |
| 100% LLDPE1 | 1 | 31 | 375 | 420 | 390 | 375 | 376 | 446 | 451 | 448 | 450 | 451 | 439 | 2.7 |
| 80% LLDPE1 + 20% CE 1 | 1 | 55 | 375 | 420 | 390 | 375 | 375 | 451 | 449 | 442 | 450 | 450 | 448 | 10.1 |
| 80% LLDPE1 + 20% Ex. 1 | 1 | 61 | 375 | 418 | 388 | 378 | 376 | 451 | 451 | 458 | 450 | 451 | 462 | 11.5 |
| 80% LLDPE1 + 20% CE 9 | 1 | 50 | 376 | 421 | 391 | 375 | 375 | 452 | 450 | 459 | 450 | 450 | 460 | 11 |

Blow-up ratio of 2.5:1 for all film samples above

Films of LDPE Alone

Films of Example 1 and Comparative Example 1 were made on a 6" die with a LLDPE type screw. No internal bubble cooling is used. General blown film parameters used to produce the blown film are shown in Table 13. The temperatures show the temperatures closest to the pellet hopper (Barrel 1) and in increasing order as the polymer is being extruded through the die (melt temperature). The film properties of these two examples are shown in Table 14. Example 1 has a relatively higher percentage of its total haze being composed of surface haze, as reflected by its higher surface/internal haze ratio. Additionally, the MD and CD shrink tension of Example 1 are improved over that of the comparative sample, making this a potentially good LDPE for use in shrink applications.

TABLE 13

Blown film fabrication conditions for Example 1 and Comparative Example 1 samples with physical property results shown in Table 14.

| Parameter | Value |
|---|---|
| Blow up ratio (BUR) | 2.5 |
| Output (lb/hr) | 188 |
| Film thickness | 2.0 |
| Die gap (mil) | 40 |
| Air temperature (° F.) | 45 |
| Temperature profile (° F.) | |
| Barrel 1 | 310 |
| Barrel 2 | 330 |

TABLE 13-continued

Blown film fabrication conditions for Example 1 and Comparative Example 1 samples with physical property results shown in Table 14.

| Parameter | Value |
|---|---|
| Barrel 3 | 350 |
| Barrel 4 | 380 |
| Barrel 5 | 380 |
| Screen Temperature | 420 |
| Adapter | 420 |
| Rotator | 420 |
| Lower Die | 420 |
| Upper Die | 420 |
| Melt Temperature | 430 |

TABLE 14

Physical properties of film with process conditions shown in Table 13.

| Description | Example 1 | Comparative Example 1 |
|---|---|---|
| Clarity (%) | 91 | 93 |
| Gloss 45 degree (%) | 69 | 74 |
| Gloss 60 degree (%) | 89 | 102 |
| Haze (%) | 8.92 | 7.72 |
| Haze - Internal (%) | 1.08 | 1.07 |
| Haze - Surface (%) | 7.8 | 6.7 |
| Surface/Internal Haze | 7.2 | 6.2 |
| Dart A (g) | 151 | 148 |
| Puncture (ft-lbf/in$^3$) | 61 | 65 |
| Secant Modulus 1% CD (psi) | 24,475 | 27,617 |
| Secant Modulus 2% CD (psi) | 22,502 | 24,509 |
| Secant Modulus 1% MD (psi) | 23,528 | 26,044 |
| Secant Modulus 2% MD (psi) | 21,963 | 23,453 |
| Elmendorf Tear CD (g) | 238 | 282 |
| Elmendorf MD (g) | 264 | 237 |
| Ultimate Tensile - CD (psi) | 3,215 | 3,003 |
| Ultimate Elongation - CD (%) | 544 | 535 |
| Yield Strain - CD (%) | 14 | 12 |
| Yield Strength - CD (psi) | 1,796 | 1,753 |
| Ultimate Tensile - MD (psi) | 3,610 | 3,658 |
| Ultimate Elongation - MD (%) | 337 | 370 |
| Yield Strain - MD (%) | 26 | 47 |
| Yield Strength - MD (psi) | 1,927 | 2,175 |
| Shrink Tension MD (psi) | 19.0 | 17.0 |
| Shrink Tension CD (psi) | 0.9 | 0.6 |

Figure 12:
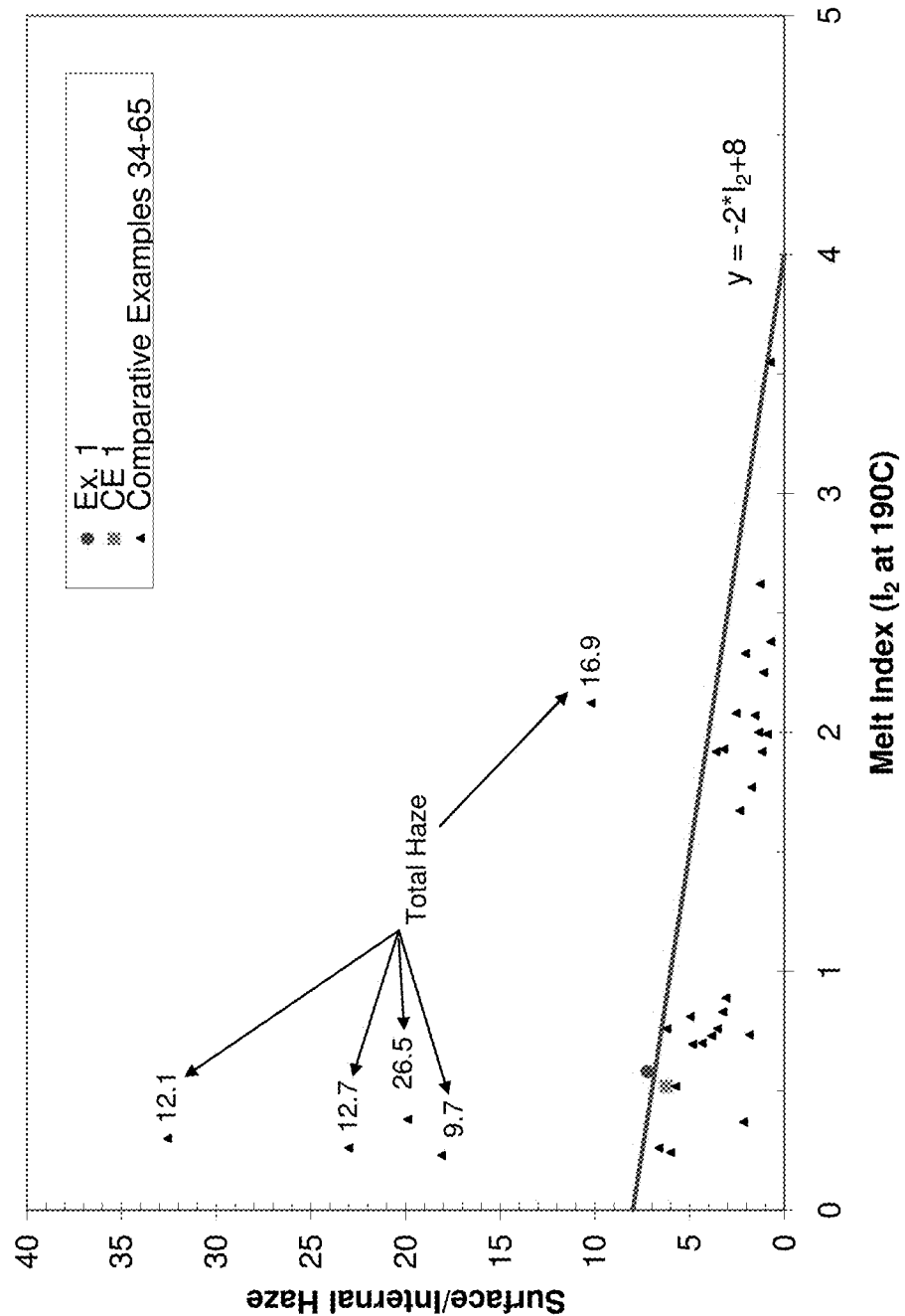
FIG. 12 is the surface/internal haze vs. the melt index for Example 1, Comparative Example 1 and other comparative examples of Table 15.

The surface/internal haze ratio is tabulated for several LDPE's made in a manner similar to those shown in Table 13. The resulting correlation of the properties of these samples is shown in Table 15 and FIG. 12. In particular Example 1 has a high surface/internal haze ratio as related to its melt index. Some other commercial LDPE's are shown that have higher surface/internal haze ratios, but this high ratio comes at the detriment of having a high overall total haze as shown in FIG. 12. The samples with higher surface/internal haze ratios have high total haze at a low melt index or correspondingly have a lower haze but at a higher overall melt index for the LDPE which is not as advantageous in terms of improved bubble stability or maintained mechanical properties (i.e., as the melt index is raised or the molecular weight is lowered, in general the mechanical properties are lowered).

The following numerical relationship exists for the materials of this invention $$S/I \geq (-2 \ast I_2) + 8 \quad \text{(Eq. 17)}$$

in particular for when the total haze of the film is less than 9.5%.

All patents, test procedures, and other documents cited, including priority documents, are fully incorporated by reference to the extent such disclosure is not inconsistent with this invention and for all jurisdictions in which such incorporation is permitted.

TABLE 15

Haze values for Ex. 1, CE1, and Comparative Commercial LDPE Ex. 34-65.

| | Melt Index | Density (g/cc) | Total Haze (%) | Internal Haze (%) | Surface Haze (%) | Surface/Internal Haze |
|---|---|---|---|---|---|---|
| Example 1 | 0.58 | 0.9211 | 8.9 | 1.1 | 7.8 | 7.2 |
| CE 1 | 0.52 | 0.9220 | 7.7 | 1.1 | 6.7 | 6.2 |
| CE 34 | 0.37 | 0.9276 | 6.1 | 1.9 | 4.1 | 2.1 |
| CE 35 | 0.69 | 0.9227 | 9.6 | 1.6 | 8.0 | 4.8 |
| CE 36 | 0.52 | 0.9286 | 9.4 | 1.4 | 8.0 | 5.7 |
| CE 37 | 1.67 | 0.9243 | 6.4 | 1.9 | 4.5 | 2.3 |
| CE 38 | 0.89 | 0.9240 | 7.4 | 1.8 | 5.6 | 3.1 |
| CE 39 | 2.12 | 0.9178 | 16.9 | 1.5 | 15.4 | 10.2 |
| CE 40 | 1.99 | 0.9197 | 5.4 | 2.8 | 2.6 | 0.9 |
| CE 41 | 0.73 | 0.9202 | 6.2 | 2.2 | 4.1 | 1.9 |
| CE 42 | 0.23 | 0.9208 | 9.7 | 0.5 | 9.2 | 18.1 |
| CE 43 | 0.70 | 0.9221 | 5.6 | 1.0 | 4.5 | 4.3 |
| CE 44 | 2.07 | 0.9222 | 4.6 | 1.8 | 2.8 | 1.5 |
| CE 45 | 0.26 | 0.9186 | 12.7 | 0.5 | 12.2 | 23.0 |
| CE 46 | 2.38 | 0.9271 | 5.0 | 2.9 | 2.1 | 0.7 |
| CE 47 | 1.77 | 0.9251 | 6.0 | 2.2 | 3.8 | 1.7 |
| CE 48 | 0.76 | 0.9248 | 11.2 | 1.6 | 9.6 | 6.2 |
| CE 49 | 1.93 | 0.9201 | 6.2 | 1.5 | 4.7 | 3.2 |
| CE 50 | 0.83 | 0.9206 | 4.8 | 1.1 | 3.7 | 3.2 |
| CE 51 | 0.76 | 0.9243 | 6.0 | 1.3 | 4.7 | 3.5 |
| CE 52 | 2.00 | 0.9253 | 5.2 | 2.2 | 3.0 | 1.3 |
| CE 53 | 2.62 | 0.9246 | 7.7 | 3.4 | 4.3 | 1.3 |
| CE 54 | 0.30 | 0.9167 | 12.1 | 0.4 | 11.7 | 32.6 |
| CE 55 | 0.26 | 0.9218 | 5.7 | 0.7 | 4.9 | 6.6 |
| CE 56 | 1.92 | 0.9189 | 5.4 | 1.2 | 4.2 | 3.6 |
| CE 57 | 2.33 | 0.9195 | 4.9 | 1.6 | 3.3 | 2.1 |
| CE 58 | 0.81 | 0.9215 | 6.7 | 1.1 | 5.6 | 5.0 |
| CE 59 | 0.73 | 0.9236 | 6.9 | 1.4 | 5.5 | 3.8 |
| CE 60 | 1.92 | 0.9238 | 4.5 | 2.1 | 2.4 | 1.2 |
| CE 61 | 2.08 | 0.9207 | 5.4 | 1.5 | 3.9 | 2.5 |
| CE 62 | 2.25 | 0.9313 | 6.8 | 3.2 | 3.6 | 1.1 |
| CE 63 | 3.55 | 0.9313 | 7.4 | 4.2 | 3.1 | 0.7 |
| CE 64 | 0.38 | 0.9181 | 26.5 | 1.3 | 25.2 | 19.9 |
| CE 65 | 0.24 | 0.9215 | 9.5 | 1.4 | 8.1 | 6.0 |

What is claimed is:

1. A low density polyethylene (LDPE) characterized as having a density from about 0.9 to about 0.94 grams per cubic centimeter, a molecular weight distribution ($M_w/M_n$) from about 8 to about 12, a melt index ($I_2$) greater than 0.5 and less than 2 g/10 minutes, a gpcBR value from about 1.4 to about 10 as determined by a gpcBR Branching Index, and a GPC-LS characterization Y value less than 1.2; and wherein the polymer is prepared in a reactor configuration comprising a tubular reactor comprising multiple reaction zones, and wherein each reaction zone receives a peroxide injection, and wherein the peak temperature in each reaction zone is from 305° C. to 310° C.; and wherein the Y value is calculated from the following equations:

$$Y = \text{Log(LSCDF)} + 3.5$$

$$\text{LSCDF} = \text{Abs}(A/B \ast \text{SF}),$$

$$\text{SF} = \text{A Slope Function} = \text{Abs}(x) + 0.1,$$

wherein A=A1+A2, wherein A1 is the area bound between a straight line drawn between two logarithmic cc-GPC molecular weights at 350,000 g/mole and 1,320,000 g/mole, and the concentration-normalized LS concentration curve, where the concentration-normalized LS response value of the straight line is greater than the concentration-normalized LS response value for the concentration-normalized LS chromatogram curve between the two logarithmic cc-GPC molecular weights;

A2 is the area bound between a straight line drawn between two logarithmic cc-GPC molecular weights at 350,000 g/mole and 1,320,000 g/mole, and the concentration-normalized LS concentration curve, wherein the concentration-normalized LS response value of the straight line is less than the concentration-normalized LS response value for the concentration-normalized LS chromatogram curve between the two logarithmic cc-GPC molecular weights;

B is the area under the concentration-normalized LS chromatogram curve between the two logarithmic cc-GPC molecular weight values;

wherein the value of "x" is defined as follows:

$$x = \frac{\frac{LSresponse_{(Point2,CN)} - LSresponse_{(Point2,CN)}}{LSresponse_{(Point2,CN)}}}{\log MW_{(Point2,ccGPC)} - \log MW_{(Point1,ccGPC)}};$$

wherein the "log MW" terms are the above logarithmic cc-GPC molecular weights for Points 1 and 2, respectively, and the "LS response" terms are the concentration-normalized LS response values for Points 1 and 2, respectively.

2. A composition comprising the polymer of claim 1 and at least one other natural or synthetic polymer.

3. The composition of claim 2 wherein the synthetic polymer is selected from the group consisting of linear low density polyethylene (LLDPE), high density polyethylene (HDPE), and a low density polyethylene (LDPE).

4. The composition of claim 2 wherein the synthetic polymer comprises LLDPE.

5. The composition of claim 4 wherein the LLDPE comprises at least 50 percent or greater, by weight of the composition.

6. At least one film layer comprising the composition of claim 3.

7. The polymer of claim 1, wherein the polymer has a GPC Mw and a zero shear viscosity ($\eta_o$)(Pa*s) relationship $$\log(\eta_o(Pa*s)) > 3.6607*\log(GPC\ Mw) - 14.678.$$

8. The polymer of claim 1, wherein the polymer has a melt strength at 190° C. in cN of greater than 11.5 cN.

9. A film comprising at least one film layer comprising the polymer of claim 1.

10. The film layer according to claim 9, wherein the film layer has a machine direction (MD) shrink tension greater than 15 psi.

11. The polymer of claim 1, wherein the LDPE polymer has a molecular weight distribution from 8.43 to 8.72.

12. A low density polyethylene (LDPE) characterized as having a density from about 0.9 to about 0.94 grams per cubic centimeter, a molecular weight distribution ($M_w/M_n$) from about 8 to about 12, a melt index ($I_2$) greater than 0.5 and less than 2 g/10 minutes, a gpcBR value from about 1.4 to about 10 as determined by a gpcBR Branching Index, and a GPC-LS characterization Y value less than 1.2, a surface haze, S, an internal haze, I, both in units of % haze and both determined using Surface and Internal Haze method, where the numerical values of S, I, and $I_2$ correspond to the following relationship:

$$S/I > (-2*I_2) + 8,\ and$$

in which the total haze is less than 9.5%; and wherein the polymer is prepared in a reactor configuration comprising a tubular reactor comprising multiple reaction zones, and wherein each reaction zone receives a peroxide injection, and wherein the peak temperature in each reaction zone is from 305° C. to 310° C.; and wherein the Y value is calculated from the following equations:

$$Y = \text{Log}(LSCDF) + 3.5$$

$$LSCDF = \text{Abs}(A/B*SF),$$

$$SF = A\ \text{Slope Function} = \text{Abs}(x) + 0.1,$$

wherein A=A1+A2, wherein A1 is the area bound between a straight line drawn between two logarithmic cc-GPC molecular weights at 350,000 g/mole and 1,320,000 g/mole, and the concentration-normalized LS concentration curve, where the concentration-normalized LS response value of the straight line is greater than the concentration-normalized LS response value for the concentration-normalized LS chromatogram curve between the two logarithmic cc-GPC molecular weights;

A2 is the area between a straight line drawn between two logarithmic cc-GPC molecular weights at 350,000 g/mole and 1,320,000 g/mole, and the concentration-normalized LS concentration curve, wherein the concentration-normalized LS response value of the straight line is less than the concentration-normalized LS response value for the concentration-normalized LS chromatogram curve between the two logarithmic cc-GPC molecular weights;

B is the area under the concentration-normalized LS chromatogram curve between the two logarithmic cc-GPC molecular weight values;

wherein the value of "x" is defined as follows:

$$x = \frac{\frac{LSresponse_{(Point2,CN)} - LSresponse_{(Point2,CN)}}{LSresponse_{(Point2,CN)}}}{\log MW_{(Point2,ccGPC)} - \log MW_{(Point1,ccGPC)}};$$

wherein the "log MW" terms are the above logarithmic cc-GPC molecular weights for Points 1 and 2, respectively, and the "LS response" terms are the concentration-normalized LS response values for Points 1 and 2, respectively.

13. The polymer of claim 12, wherein the LDPE polymer has a molecular weight distribution from 8.43 to 8.72.

* * * * *